(12) United States Patent
Hobbs et al.

(10) Patent No.: US 8,560,753 B1
(45) Date of Patent: Oct. 15, 2013

(54) METHOD AND APPARATUS FOR REMOTE INPUT/OUTPUT IN A COMPUTER SYSTEM

(75) Inventors: David Victor Hobbs, Surrey (CA); Ian Cameron Main, Vancouver (CA)

(73) Assignee: Teradici Corporation, Burnaby, British Columbia (CA)

( * ) Notice: Subject to any disclaimer, the term of this patent is extended or adjusted under 35 U.S.C. 154(b) by 616 days.

(21) Appl. No.: 12/383,291

(22) Filed: Mar. 23, 2009

Related U.S. Application Data

(63) Continuation-in-part of application No. 11/284,676, filed on Nov. 21, 2005, now Pat. No. 7,516,255, and a continuation-in-part of application No. 11/333,955, filed on Jan. 17, 2006, now Pat. No. 7,747,086.

(60) Provisional application No. 60/667,157, filed on Mar. 30, 2005, provisional application No. 60/703,767, filed on Jul. 28, 2005.

(51) Int. Cl.
*G06F 15/16* (2006.01)

(52) U.S. Cl.
USPC ............. 710/306; 710/1; 710/72; 710/305; 710/313; 710/314; 710/315; 345/2.1; 348/14.08; 348/14.1; 348/14.13; 348/14.15; 709/204

(58) Field of Classification Search
None
See application file for complete search history.

(56) References Cited

U.S. PATENT DOCUMENTS

| | | | | |
|---|---|---|---|---|
| 3,952,296 A | | 4/1976 | Bates ............................ 345/559 |
| 4,785,349 A | * | 11/1988 | Keith et al. ............... 375/240.23 |
| 5,157,491 A | | 10/1992 | Kassatly ..................... 348/14.08 |
| 5,363,139 A | * | 11/1994 | Keith ......................... 375/240.12 |
| 5,434,913 A | * | 7/1995 | Tung et al. ................ 379/202.01 |
| 5,583,573 A | | 12/1996 | Asamura et al. ......... 375/240.04 |
| 5,691,777 A | | 11/1997 | Kassatly .................... 375/240.18 |
| 5,767,978 A | | 6/1998 | Revankar et al. ............. 358/296 |
| 5,768,533 A | | 6/1998 | Ran ............................... 709/247 |
| 5,844,600 A | * | 12/1998 | Kerr ........................... 348/14.12 |
| 5,953,049 A | * | 9/1999 | Horn et al. ................. 348/14.09 |
| 6,014,694 A | | 1/2000 | Aharoni et al. ............... 709/219 |
| 6,061,521 A | * | 5/2000 | Thayer et al. .................... 712/9 |
| 6,233,017 B1 | * | 5/2001 | Chaddha .................. 375/240.12 |
| 6,259,471 B1 | * | 7/2001 | Peters et al. ............... 348/14.12 |
| 6,633,934 B1 | | 10/2003 | Thornton ....................... 710/100 |
| 6,664,969 B1 | | 12/2003 | Emerson et al. ............... 345/544 |
| 6,671,756 B1 | | 12/2003 | Thomas et al. .................. 710/73 |
| 6,701,380 B2 | | 3/2004 | Schneider et al. ............ 709/250 |

(Continued)

OTHER PUBLICATIONS

'Universal Serial Bus Specification' Revision 2.0, Apr. 27, 2000.*

(Continued)

*Primary Examiner* — Steven Snyder
(74) *Attorney, Agent, or Firm* — Moser Taboada

(57) ABSTRACT

A method and system for providing computer input/output (I/O) functionality within a remote computing environment. The system comprises a host audio controller and a remote audio controller for bridging audio data between a host computing system and at least one remote audio device, a host USB controller and a remote USB controller for bridging USB data between the host computing system and at least one remote USB device, and an encoder module and a remote display decoder for bridging a digital video signal from the host computing system to a remote display, wherein the host audio controller, the host USB controller, and the encoder module are communicatively coupled to the remote audio controller, the remote USB controller, and the remote display decoder, respectively, via a computer network.

48 Claims, 21 Drawing Sheets

(56) References Cited

U.S. PATENT DOCUMENTS

| | | | | |
|---|---|---|---|---|
| 6,774,904 | B2* | 8/2004 | Emerson et al. | 345/547 |
| 7,103,788 | B1* | 9/2006 | Souza et al. | 713/323 |
| 7,260,624 | B2* | 8/2007 | Sivertsen | 709/223 |
| 7,376,695 | B2 | 5/2008 | Duursma et al. | 709/203 |
| 7,447,740 | B2* | 11/2008 | AbiEzzi et al. | 709/204 |
| 7,519,749 | B1* | 4/2009 | Sivertsen | 710/73 |
| 7,631,277 | B1* | 12/2009 | Nie et al. | 715/848 |
| 7,706,901 | B2* | 4/2010 | Berreth | 700/94 |
| 2002/0126626 | A1* | 9/2002 | Singh et al. | 370/260 |
| 2002/0149617 | A1 | 10/2002 | Becker | 715/751 |
| 2002/0158878 | A1* | 10/2002 | Smirnov et al. | 345/545 |
| 2002/0181686 | A1* | 12/2002 | Howard et al. | 379/202.01 |
| 2002/0199047 | A1 | 12/2002 | DuPont et al. | 710/100 |
| 2003/0088727 | A1* | 5/2003 | Zarns | 710/313 |
| 2003/0126294 | A1* | 7/2003 | Thorsteinson et al. | 709/247 |
| 2003/0142111 | A1* | 7/2003 | Emerson et al. | 345/600 |
| 2003/0189574 | A1 | 10/2003 | Ramsey | 345/555 |
| 2003/0191860 | A1 | 10/2003 | Gadepalli et al. | 709/247 |
| 2003/0208779 | A1 | 11/2003 | Green et al. | 725/143 |
| 2003/0235407 | A1* | 12/2003 | Lord | 386/96 |
| 2004/0008205 | A1 | 1/2004 | O'Neill et al. | 345/555 |
| 2004/0008213 | A1 | 1/2004 | O'Neill et al. | 345/670 |
| 2004/0008214 | A1 | 1/2004 | O'Neill et al. | 345/670 |
| 2004/0010622 | A1 | 1/2004 | O'Neill et al. | 709/247 |
| 2004/0015991 | A1 | 1/2004 | Thornton | 725/74 |
| 2004/0019834 | A1* | 1/2004 | Chan et al. | 714/47 |
| 2004/0049624 | A1* | 3/2004 | Salmonsen | 710/306 |
| 2004/0059782 | A1* | 3/2004 | Sivertsen | 709/204 |
| 2004/0062305 | A1 | 4/2004 | Dambrackas | 375/240.01 |
| 2004/0080526 | A1 | 4/2004 | Thornton | 715/721 |
| 2004/0119814 | A1* | 6/2004 | Clisham et al. | 348/14.08 |
| 2004/0205214 | A1* | 10/2004 | Bång et al. | 709/231 |
| 2005/0100100 | A1* | 5/2005 | Unger | 375/240.27 |
| 2005/0182876 | A1* | 8/2005 | Kim et al. | 710/100 |
| 2006/0092951 | A1* | 5/2006 | Peak et al. | 370/397 |
| 2006/0146058 | A1* | 7/2006 | Zhang et al. | 345/531 |
| 2006/0188014 | A1* | 8/2006 | Civanlar et al. | 375/240.03 |
| 2006/0233201 | A1 | 10/2006 | Wiesenthal | 370/477 |
| 2006/0288373 | A1* | 12/2006 | Grimes et al. | 725/62 |
| 2007/0055997 | A1* | 3/2007 | Witwer | 725/81 |
| 2008/0170616 | A1* | 7/2008 | Hwang et al. | 375/240.16 |
| 2009/0117890 | A1* | 5/2009 | Jacobsen et al. | 455/419 |
| 2012/0028712 | A1* | 2/2012 | Zuili | 463/39 |

OTHER PUBLICATIONS

Wikipedia article on Local Area Network (LAN) from Aug. 5, 2004.*
Wikipedia article on Digital Visual Interface (DVI) from Feb. 13, 2004.*
Wikipedia article on Ethernet from Feb. 15, 2004.*
'DX-10 Digital Upgrade' from Component Engineering.*
'System Administration Guide: Devices and File Systems' by Sun Microsystems Inc., copyright 2004.*
Wikipedia's 'Digital Visual Interface' article describing 'Digital Video Interface' (DVI).*
'Sun Fire V60x and Sun Fire V65x Server User Guide,' chapter 7, copyright 2003, Sun Microsystems, Inc.*
'TCP/IP Tutorial and Technical Overview' by IBM, pp. 201-228, copyright IBM Corp. 2001.*
U.S. Office Action mailed Jun. 2, 2008 for U.S. Appl. No. 11/284,676, filed Nov. 21, 2005.
U.S. Office Action mailed Jun. 4, 2008 for U.S. Appl. No. 11/549,055, filed Oct. 12, 2006.
Thekkath, Chandramohan A. and Levy, Henry M., "Limits to Low-Latency Communication on High-Speed Networks," University of Washington, Seattle, ACM Transactions on Computer Systems, vol. 11, No. 2, May 1993, pp. 179-203.
Nieh, J., Yang, S. J., and Novik, N., "A Comparison of Thin-Client Computing Architectures," Technical Report CUCS-022-00, Network Computing Laboratory, Columbia University, Nov. 2000, 16 pages.
Stegmaier, S., Magallón, M. and Ertl, T., "A Generic Solution for Hardware-Accelerated Remote Visualization," Joint EUROGRAPHICS—IEEE TCVG Symposium on Visualization, 2002, pp. 87-94.
Yang, S. J., Nieh, J., Selsky, M. and Tiwari, N., "The Performance of Remote Display Mechanisms for Thin-Client Computing," Department of Computer Science, Columbia University, Proceedings of the 2002 USENIX Annual Technical Conference, Jun. 2002.
"LongViewe® IP Desktop Extension over IP Solutions," Copyright 2007 Avocent Corporation, 2 pages.
"HP Remote Graphics Software High performance remote access software with 'just like local' feel," Copyright 2007 Hewlett-Packard Development Company, L.P., 4 pages.
"Advantages and Implementation of HP Remote Graphics Software," Copyright 2006 Hewlett-Packard Development Company, L.P., pp. 1-9.
Gilbert, Jeffrey Michael, "Text / Graphics and Image Transmission over Bandlimited Lossy Links," A thesis submitted in partial satisfaction of the requirements for the degree of Doctor of Philosophy in Engineering Electrical Engineering and Computer Sciences in the Graduate Division of the University of California, Berkeley, Spring 2000, 276 pages, Berkeley, CA.
Buck, Ian, Humphreys, Greg, and Hanrahan, Pat, "Tracking Graphics State for Networked Rendering," Proceedings of SIGGRAPH/Eurographics Workshop on Graphic Hardware, Aug. 2000, 9 pages.
"OpenGL Vizserver™ 3.1 Application-Transparent Remote Interactive Visualization and Collaboration," White Paper, Silicon Graphics Inc., 2003, 15 pages.
Humphreys, Greg, and Hanrahan, Pat, "A Distributed Graphics System for Large Tiled Displays," Proceedings IEEE Visualization '99, 1999, 9 pages.

* cited by examiner

METHOD AND APPARATUS FOR REMOTE INPUT/OUTPUT IN A COMPUTER SYSTEM

CROSS-REFERENCE TO RELATED APPLICATIONS

This application is a continuation-in-part of U.S. patent application Ser. No. 11/284,676, filed Nov. 21, 2005, now U.S. Pat. No. 7,516,255 which claims benefit of U.S. provisional patent application Ser. No. 60/667,157, filed Mar. 30, 2005, and a continuation-in-part of U.S. patent application Ser. No. 11/333,955, filed Jan. 17, 2006, now U.S. Pat. No. 7,747,086 which claims benefit of U.S. provisional patent application Ser. No. 60/703,767, filed Jul. 28, 2005. Each of the aforementioned related patent applications is herein incorporated in its entirety by reference.

BACKGROUND OF THE INVENTION

1. Field of the Invention

Embodiments of the present invention generally relate to computer systems and, more particularly, to a method and system for computer input/output within a remote computing environment.

2. Description of the Related Art

Historic advances in computer technology have made it economical for individual users to own their own computing system, which has caused the proliferation of the Personal Computer (PC). Additionally, PCs are widely used in a variety of businesses environments. Reliance on PCs for performing day-to-day activities, including professional and personal activities, is complicated by the increasing mobility of PC users. For example, flexible work environments allowing employees to work at a remote location and increased business travel reduce the efficiency of employees unable to access their work PCs. Additionally, maintaining PCs at a remote location is a complex and burdensome task.

Therefore, there is a need for remote computer input/output that functions as if locally connected to the data processing and storage of a computer system.

SUMMARY OF THE INVENTION

Embodiments of the present invention generally relate to a method and system for providing computer input/output (I/O) functionality within a remote computing environment. The system comprises a host audio controller and a remote audio controller for bridging audio data between a host computing system and at least one remote audio device, a host USB controller and a remote USB controller for bridging USB data between the host computing system and at least one remote USB device, and an encoder module and a remote display decoder for bridging a digital video signal from the host computing system to a remote display, wherein the host audio controller, the host USB controller, and the encoder module are communicatively coupled to the remote audio controller, the remote USB controller, and the remote display decoder, respectively, via a computer network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention enables the data processing and storage of a computer system to be separated from the user interface (e.g., display, keyboard, mouse, and the like) and remotely located, allowing the data processing and storage of multiple computer systems to be centralized for optimum management. A communication structure communicably couples the user interface devices and the data processing system.

Figure 1:
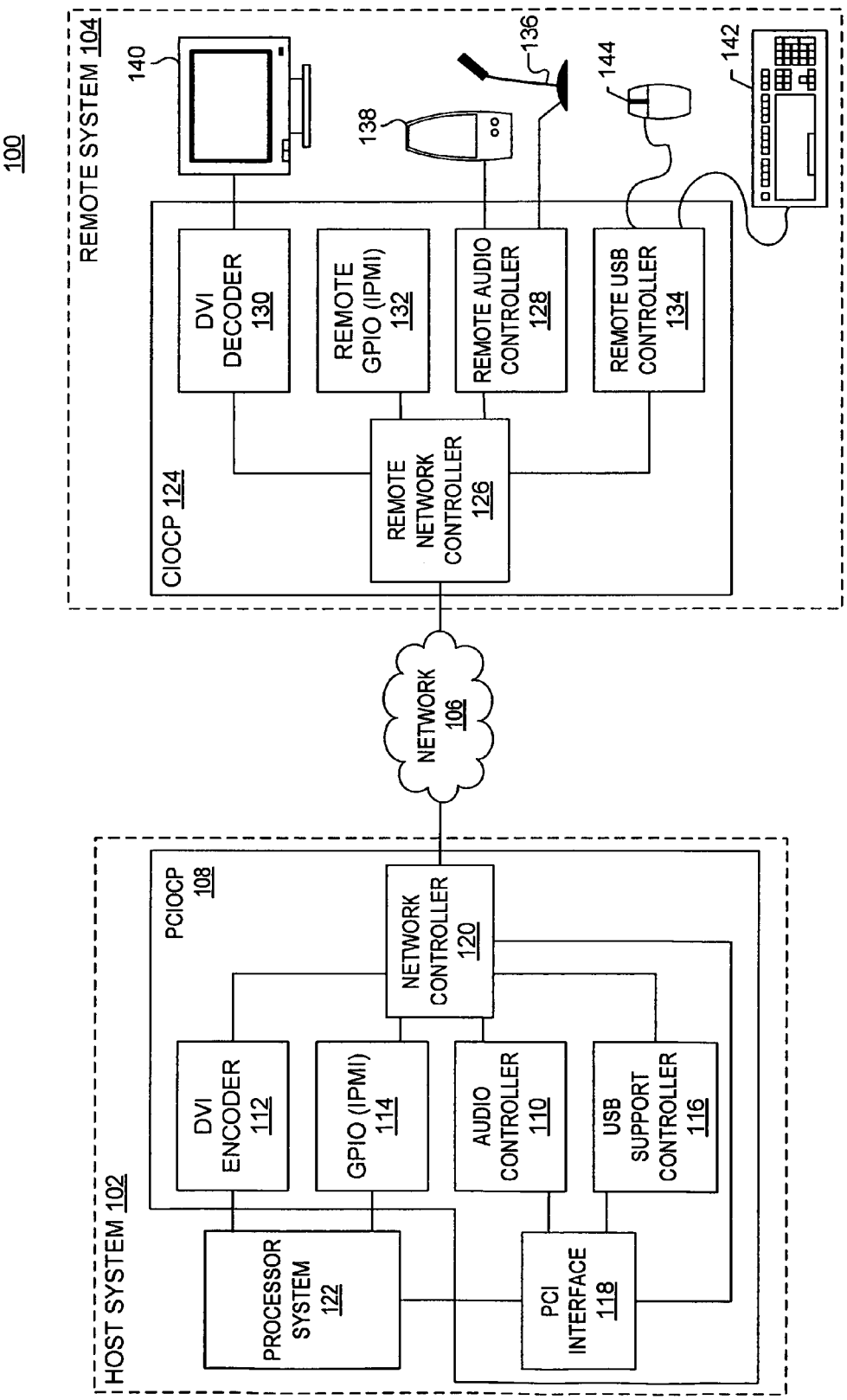
FIG. 1 is a block diagram of a remote computer user interface system in accordance with one or more embodiments of the present invention.

FIG. 1 is a block diagram of a remote computer user interface system 100 in accordance with one or more embodiments of the present invention. The remote computer user interface system 100 ("system 100") comprises a host system 102 coupled to a remote input/output (I/O) system 104 ("remote system 104") via communications network 106; in alternative embodiments, the host system 102 may be coupled to more than one remote system 104. In some embodiments, the communications network 106 is a computer network comprising a standard IP/Ethernet network and may comprise dedicated cables, wireless networks, LANs, WANs, the Internet, and the like.

The host system 102 comprises a personal computer (PC) input/output (I/O) communication processor (PCIOCP) 108 coupled to a processor system 122 (i.e., a host computing system). The PCIOCP 108 generally comprises a Field Programmable Gate Array (FPGA), Application Specific Integrated Circuit (ASIC), or System-on-Chip (SoC) device configured, at least in part, to execute various remote computing system functions described (e.g., encoding, decoding, network communication, bridging, and the like). In an embodiment, PCIOCP 108 comprises an audio controller 110, a digital video encoder, such as Digital Visual Interface (DVI) encoder 112, a General Purpose Input/Output (GPIO) interface 114 such as an Intelligent Platform Management Interface (IPMI), a USB support controller 116 (i.e., a host USB controller), and a peripheral component interconnect (PCI) interface 118, each coupled to a network controller 120. The various digital video bridging embodiments of the present invention provide an at least DVI-quality video performance wherein user perception and scalability meet or exceed the performance and scalability specified in section 1.2 of the Digital Visual Interface (DVI) Revision 1.0 published 2 Apr. 1999 by the Digital Display Working Group (DDWG), including a display resolution of at least 640×480 pixels and user perceived image quality associated with a DVI interconnect operating at a frequency of at least 25 MHz. In an exemplary embodiment, a digital video bridge provides the user perception equivalent of a DVI interconnect transporting a 24-bit image of 1920×1200 pixels at a frame rate of 60 frames per second. In one or more alternative embodiments, the DVI encoder 112 may be a digital video encoder for additionally and/or alternatively encoding a dual-link DVI signal, multiple DVI signals, a DISPLAYPORT signal, an HDMI signal, a DPVL signal, and/or similar types of digital video signals.

In some embodiments, the DVI encoder 112 and the GPIO 114 are coupled directly to the processor system 122, while the PCI interface 118 provides an interface, such as PCI-Express or a similar type of interface, for coupling the USB support controller 116 and a PC MAC within the network controller 120 to the processor system 122. In some embodiments, such as various HD (High Definition) audio embodiments, audio controller 110 is also coupled to processor system 122 via the PCI interface 118. In other embodiments, such as various AC'97-compatible audio embodiments, audio controller 110 is replaced with an audio coder-decoder (codec) coupled to an audio controller function of processor system 122 via an audio connection (e.g., an AC-link). Such an audio codec is described in further detail below with respect to FIG. 7. The audio controller 110, DVI encoder 112, GPIO (IPMI) 114, and USB support controller 116 each present industry-standard interfaces to the processor system 122, function without requiring any additional proprietary software to be run on the processor system 122, and function without additional loading or impacting the performance of the processor system 122.

The processor system 122 performs various application processing and, as a result of such application processing, may generate output autonomously and/or in response to input (e.g., user input) from the remote system 104 for display/use at the remote system 104. Such output may include display images (e.g., computer video signals), audio data, general purpose input/output (GPIO) data, and/or USB signals for control of computer peripherals such as a keyboard, mouse, printer, web cam, biometric devices, and the like. Additionally, the processor system 122 may receive input from the remote system 104 such as audio, GPIO, and USB data.

The processor system 122 may be a blade PC, a workstation, a standard desktop computer, a pedestal computer, a rack mount computer, or a similar type of computer processor. The processor system 122 may comprise a graphics processor for generating a DVI signal; in alternative embodiments, the graphics processor may additionally and/or alternatively generate digital video signals such as a High Definition Multimedia Interface (HDMI) signal, a DISPLAYPORT interface signal, a DPVL signal, or similar type of digital video signal. In alternative embodiments, the PCIOCP 108 may be contained within a PCI or PCI-Express card utilizing an AC-97 or HD audio controller to generate AC-97 or HD audio signals from PCI bus communications; additionally, a video signal such as a DVI, HDMI, DPVL, or DISPLAYPORT signal from the processor system 122 may be cabled to the card. Alternatively, the PCIOCP 108 may include AC-97 codec functions and generate pulse-code modulated (PCM) data internally.

The remote system 104 is a terminal in a networked computer system (e.g., system 100). Examples of such remote terminals include thin client computers, personal computers, notebook computers, workstations, Personal Digital Assistants (PDAs), wireless devices, and the like. Remote system 104 comprises a Client Input/Output (I/O) Communication Processor (CIOCP) 124 coupled to various peripheral devices. In various embodiments the CIOCP 124 comprises a Field Programmable Gate Array (FPGA), Application Specific Integrated Circuit (ASIC), or System-on-Chip (SoC) device configured, at least in part, to execute various remote computing system functions described encoding, decoding, network communication, bridging, and the like. In the embodiment of system 100, CIOCP 124 comprises a DVI decoder 130, a remote audio controller 128, a remote GPIO 132, and a remote USB controller 134, each coupled to a remote network controller 126. Additionally, the DVI decoder 130 is coupled to a display 140, the remote USB controller 134 is coupled to a keyboard 142 and a mouse 144, and the remote audio controller 128 is coupled to a speaker 138 and a microphone 136. Additionally and/or alternatively, the CIOCP 124 may be coupled to one or more other peripherals, such as DVD/CD drives, scanners, printers, web cams, smart card readers and other security devices, and the like. The DVI decoder 130, remote GPIO 132, remote audio controller 128, and remote USB controller 134 each present an industry-standard interface to the corresponding peripheral devices, where one or more of such interfaces may be different from the complementary interface presented by the DVI encoder 112, GPIO 114, audio controller 110, and/or USB support controller 116 to the processor system 122. In some embodiments, DVI decoder 130 may be a digital video decoder for additionally and/or alternatively decoding an encoded DISPLAYPORT signal, HDMI signal, DPVL signal, and/or similar types of encoded digital video signals.

The remote network controller 126 is coupled to the communications network 106 for transmitting audio and USB data from the peripheral devices to the host system 102 and for receiving display (i.e., digital video), audio, and/or USB data from the host system 102. In some embodiments, the remote system 104 may be implemented as a standard computer platform with a standard display. In other embodiments, CIOCP 124 is implemented as a digital circuit integrated into a device such as display 140 or a desktop telephone.

In accordance with one or more embodiments of the present invention, the host system 102 and the remote system 104 operate as if directly connected to one another; i.e., operation and user-perception is as if the peripheral devices of the remote system 104 were locally connected to the processor system 122. Thus, the processor system 122 is able to operate using device and controller drivers intended for local connections of video, audio, USB, and GPIO peripheral devices. The DVI encoder 112 receives a digital video signal, such as a DVI signal, from the processor system graphics processor. The DVI signal may be received as a series of horizontal scan lines of pixels (i.e., a raster scan), where each scan line comprises a scan line position indicating a position for display (i.e., a raster scan display) and the scan line position may comprise a frame number and/or a position within a frame. The DVI encoder 112 encodes (i.e., compresses) the DVI signal in real time; in some embodiments, a suitable encoding method may be selected based on one or more characteristics such as image type, image changes, display priority, or availability of network bandwidth. The DVI encoder 112 forwards the compressed DVI signal to the network controller 120.

The network controller 120 encapsulates the received compressed digital video signal and transmits the encapsulated signal in real time over the communications network 106 to the remote network controller 126 at the remote system 104. The remote network controller 126 receives the transmitted data, extracts the compressed digital video signal from the packets, and forwards the compressed DVI signal to the DVI decoder 130. The DVI decoder 130 decodes the compressed DVI signal and couples the resulting reconstructed DVI signal to the display 140 for display. The reconstructed DVI signal is displayed in accordance with the scan line position and a raster position for display; for example, a scan line of the reconstructed DVI signal is displayed when the associated scan line position matches a raster position of a display controller within the CIOCP 124.

If the communications network bandwidth (i.e., the available bandwidth of network 106) is insufficient to carry the compressed DVI signal, the DVI encoder 112 may reduce the required bandwidth, resulting in some loss of information, typically imperceptible to a user. If additional bandwidth reduction is required, the DVI encoder 112 may further reduce the image quality such that the compressed digital video data rate is within the available network bandwidth. The DVI encoder 112 forwards the compressed signal to the network controller 120 using, for example, the internal bus infrastructure of PCIOCP 108.

The DVI encoder 112 and DVI decoder 130 provide a video bridge between the processor system 122 and the remote display 140 by presenting industry-standard video interfaces to the processor system 122 and the remote display 140, respectively, for bridging the DVI signal between the processor system 122 and the remote display 140. The DVI encoder 112 and DVI decoder 130 are enabled to reproduce the DVI signal losslessly to provide the exact same image and frame sequence that would be seen if the display 140 were connected locally to the processor system 122. The DVI decoder 130 synchronizes its reconstructed DVI signal to the DVI signal of the DVI encoder 112 with minimal latency. In some embodiments, such synchronization comprises generating a display of the reconstructed DVI signal at a sub-frame latency (i.e., a delay of less than one frame period) with respect to the DVI signal received from processor system 122 at the DVI encoder 112. Additionally, the latency (i.e., delay) between input from the remote system 104 and a corresponding display of the reconstructed DVI signal at the remote system 104 may be imperceptible to a user.

In some embodiments, DVI frame refresh cycles for the DVI signal frames of the DVI encoder 112 and the DVI decoder 130 are synchronized and the DVI signal is processed as a real-time stream of data to remove any jitter or tearing (i.e., the reconstructed DVI signal is able to be displayed without user-perceptible jitter or tearing). The delay of the DVI signal to the display 140 (i.e., the DVI signal from the processor system 122 to the display 140) is dependent on a fixed processing time, a delay of the communications network 106, and a buffer of time to allow for network delay variations. In addition to providing a remote DVI image signal, system 100 provides bi-directional control and status communications between the host system 102 and the remote system 104. For example, the DVI encoder 112 and DVI decoder 130 provide a display management channel between the host system 102 and the remote system 104; in some embodiments, the display management channel comprises a Display Data Channel (DDC) for communicating specifications from the display 140 to the processor system 122.

In various audio embodiments, the audio controller 110 receives digital audio data (e.g., PCM, HD audio data, and the like) from the processor system 122 over the PCI interface 118 or an audio coupling such as an AC-Link. The audio controller 110 compresses (i.e., encodes) the digital audio data and couples the compressed digital audio data to the network controller 120. The network controller 120 combines the compressed digital audio data with the compressed digital video signal packets to minimize the number of packets for transmission, and sends the resulting packets to the remote system 104 via the network 106. At the remote system 104, the remote network controller 126 extracts the compressed digital audio data and couples the extracted signal to the remote audio controller 128, where it is converted to a continuous audio stream, such as PCM or HD audio. The resulting reconstructed audio stream is generally coupled to a digital to analog converter (DAC) associated with a codec function of remote audio controller 128 for conversion to analog before being sent to the speaker 138.

Additionally, a reverse audio path from the remote system 104 to the host system 102 allows devices like the microphone 136 to be remotely coupled to the processor system 122. The remote audio controller 128 utilizes adjustable compression techniques to compress an audio stream received from the microphone 136, and forwards the compressed audio stream to the remote network controller 126. The network controller 126 packetizes the compressed audio stream for transmission to the network controller 120 via the communications network 106. The network controller 120 retrieves the compressed audio stream and forwards such stream to the audio controller 110, where the compressed audio stream is decoded and coupled to the processor system 122. Thus, the audio controller 110 and the remote audio controller 128 provide an audio bridge by presenting industry-standard hardware audio controller interfaces to the processor system 122 and remote audio devices, respectively, for bi-directionally communicating audio data between the processor system 122 and audio devices of the remote system 104 (i.e., the audio controller 110 and the remote audio controller 128 bridge the audio data between the processor system 122 and the remote audio devices).

Analogous to the DVI signal path, the audio path between the processor system 122 and the DAC (i.e., the remote audio controller 128) in the remote system 104 is both digital and lossless in various embodiments. In other embodiments, for example embodiments where network bandwidth is insufficient to support lossless compression, the audio coding and decoding of the audio path utilizes lossy compression techniques. A range of audio compression ratios enables a trade-off between network bandwidth usage and audio quality. The audio stream is processed in real time with a processing delay that is not perceivable to a user in the case of sufficiently small communications network delay. In the event that the network delay is not sufficiently small to allow for an imperceptible processing delay, the audio signal remains synchronized with the display signal although a small delay will occur. Additionally, the audio path between the host system 102 and the remote system 104 provides a transmission path for the audio control signals for the processor system 122. One example of a standard audio controller interface is the AC' 97 interface which includes codec and mixer controls in addition to PCM audio streams. Another example of a standard audio controller interface is the HD Audio interface specified by INTEL Corporation.

The USB support controller 116 operates in conjunction with remote USB controller 134 to provide a coupling between various USB peripheral devices ordinarily operable with processor system 122 via local USB connections but instead remotely terminated by USB connections at remote system 104. The USB support controller 116 encodes the USB data from the processor system 122 and couples the encoded USB data to the network controller 120. The network controller 120 combines the encoded USB data with the compressed DVI signal and the compressed audio data packets to minimize the number of packets for transmission and sends the packets to the remote system 104 via the network 106. At the remote system 104, the remote network controller 126 extracts the encoded USB data and couples such data to the remote USB controller 134 where the USB data is reconstructed (i.e., decoded). The reconstructed USB data is coupled to the appropriate peripheral, such as the keyboard 142 and/or the mouse 144.

Analogous to the digital video and audio paths, the USB path between the processor system 122 and the remote USB controller 134 is digital and typically lossless. Since USB device functionality varies widely and some devices cannot handle data loss, lossy compression of USB data is generally impractical as a method for meeting network bandwidth usage restrictions. In select cases, lossy or lossless compression of certain data types such as USB bulk data or media-over-USB is implemented by USB support controller 116. In addition, various USB protocol transactions require that the USB support controller 116 respond to USB software more quickly than can be guaranteed by responses received over the communications network 106; as a result, the remote USB controller 134 implements most of the USB host controller functions and USB support controller 116 provides an interface to USB software that emulates such USB host controller functions.

Although most of the USB controller functions are implemented in the remote USB controller 134, the USB support controller 116 aids the remote USB controller 134 in managing the network interface. The USB support controller 116 comprises registers and buffers that provide an industry-compliant standard USB controller interface to the processor system 122, maintaining USB driver compatibility (i.e., allowing USB drivers of the processor system 122 intended for locally connected USB devices to operate with the remotely connected USB devices). With the split USB controller structure, a BIOS compatible USB controller interface is provided over the communications network 106.

Moreover, by incorporating USB host controller functionality, remote USB controller 134 is enabled to control which peripheral devices are authorized for connection and the amount of bandwidth allocated to each USB peripheral device in accordance with USB channel usage and available communications network bandwidth. In various embodiments, the bridged USB infrastructure comprising USB support controller 116 coupled to remote USB controller 134 also utilizes different data transfer types to control the communications network bandwidth usage. For example, in some instances, bulk data transfers are delayed in favor of higher priority transfers, such as isochronous transfers or control transfers, given that bulk data transfers normally make up most of the USB network traffic and have relaxed real-time transfer requirements.

The GPIO 114 and remote GPIO 132 provide support for miscellaneous I/O devices, such as an activity LED of a storage system, speakers (i.e., internal speakers), a reset button, and the like, by providing a GPIO signal bridge (i.e., presenting industry-standard GPIO interfaces to the processor system 122 and remote GPIO devices, respectively) for communicating (i.e., bridging) GPIO signals between the processor system 122 and remote GPIO devices. By interfacing to the processor system 122 at a low level physical interface, the remote user interface system 104 obtains access to such general purpose I/O signals and is able to transmit such signals via the communications network 106 without requiring a dedicated cabling system.

Additionally, the GPIO 114 and remote GPIO 132 support management functions normally found in a server management device. GPIO capabilities of the GPIO 114 may provide GPIO features found in an Intelligent Platform Management Interface (IPMI) device, thereby simplifying implementation of a remote management or IPMI circuit. In an exemplary embodiment, capabilities of the remote user interface system 100 are enhanced to allow monitoring and control of communications network bandwidth usage and I/O device enabling by a system administrator.

Additionally, in some embodiments, the remote user interface system 100 supports I/O devices such as serial and parallel ports or IEEE 1394 controllers. Such I/O device support comprises splitting the corresponding controller between the host system 102 and the remote system 104 by providing a standard compatible register set at the data processor system 122 and a supporting controller at the remote system 104, analogous to the USB support controller 116 and the remote USB controller 134. In such cases, the network controller 120 and remote network controller 126 manage communications such as register synchronization, data flow, and control plane communications between the host system 102 and the remote system 104.

The remote computer user interface system 100 minimizes traffic transmitted over the communications network 106 by assembling data from multiple sources (i.e., the audio controller 110, the DVI encoder 112, the GPIO 114, and the USB support controller 116) such that a minimum number of data packets are generated. In the event of insufficient network bandwidth, the remote computer user interface system 100 determines what type of I/O receives priority to ensure an optimum balance of each I/O. For example, a USB keyboard interrupt will receive bandwidth over an audio stream, but an audio stream may receive bandwidth before a USB bulk transfer. A high data rate display change would delay USB bulk transfer, but the quality of the image may be reduced to maintain an acceptable level of audio. The user interface bridging is done at a physical or register layer which does not require intervention into the operating system or application environment.

The remote computer user interface system 100 separates the software application environment and communication processor, allowing the application environment to employ high or low bandwidth media streams independent of the underlying communications system. The underlying communication system then adjusts the bandwidth used to within the bandwidth allocated, allowing a high I/O bandwidth software application environment to operate in both a low and high communication bandwidth environment with no change to the software application. The communication system of the remote computer user interface system 100 is able to adjust the quality of the user interface to the best achievable quality given the available bandwidth. For applications such as video, the remote computer user interface system 100 effectively transposes the original video source to a compression level suitable for the available network bandwidth.

Figure 2:
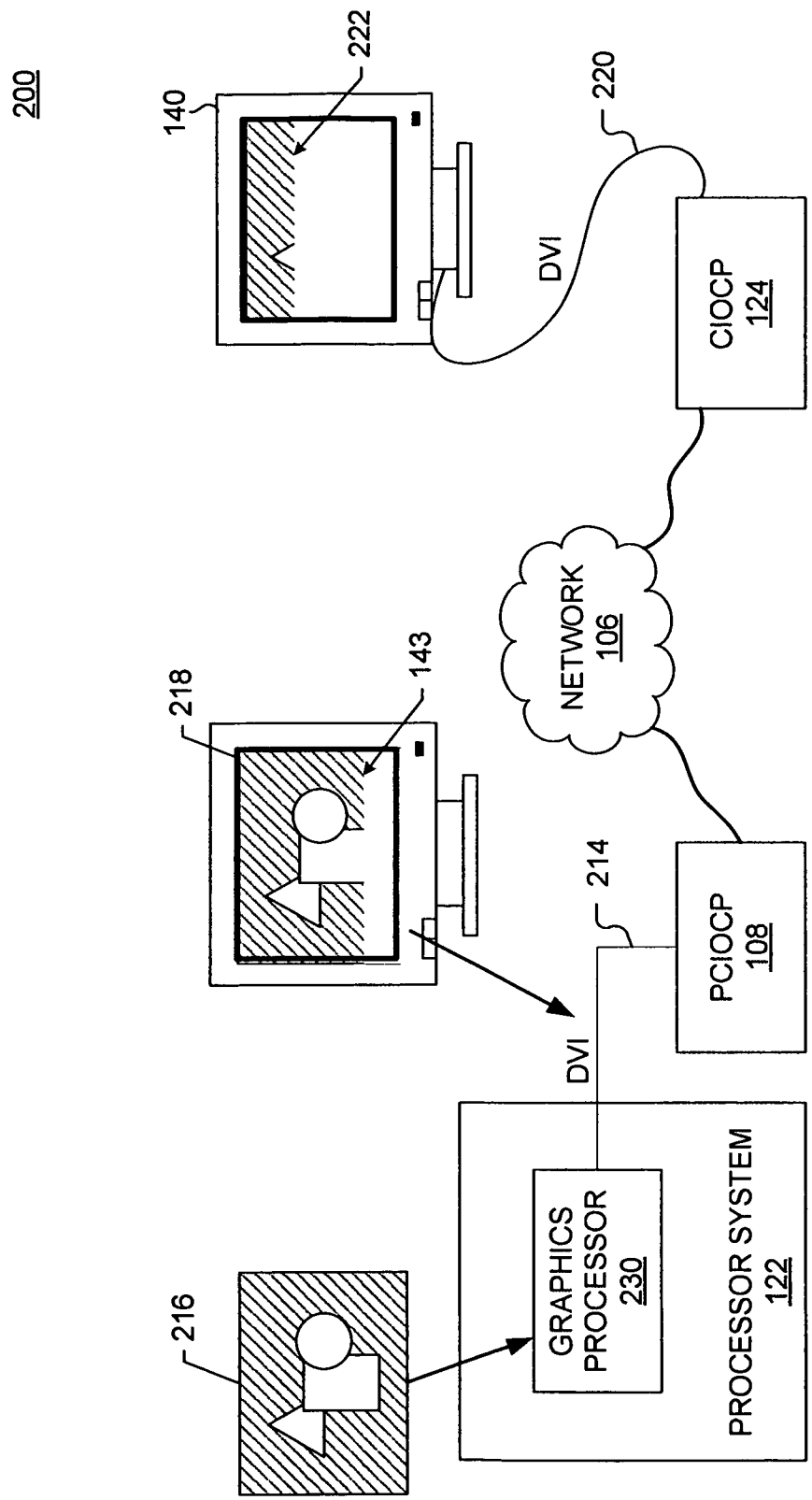
FIG. 2 is a representation of creating and communicating an image in accordance with one or more embodiments of the present invention.

FIG. 2 is a representation of creating and communicating an image 216 in accordance with one or more embodiments of the present invention. As depicted in FIG. 2, the image 216 is created by a graphics processor 230 of the processor system 122 and is communicated across the network 106 to the remote CIOCP 124. The graphics processor 230 outputs the image 216 on a digital video connection, such as a DVI or DISPLAYPORT connection. While the various embodiments depicted show a DVI implementation, other embodiments are well suited to DISPLAYPORT, High Definition Multimedia Interface (HDMI), Digital Packet Video Link (DPVL), or other digital video connections. In the exemplary DVI embodiment of system 200, DVI signal 214 is a digital raster scan (i.e., a digital signal comprising scan lines). The DVI signal 214 is fed to the PCIOCP 108 where it is encoded (i.e., compressed) and packetized for transmission across the network 106. The CIOCP 124 receives the transmitted compressed signal comprising the scan lines and generates a reconstructed DVI signal 220. The reconstructed DVI signal 220 is coupled to the remote display 140, where each reconstructed scan line of the reconstructed DVI signal 220 is displayed in accordance with a corresponding scan line position and a raster position of a display controller of the CIOCP 124.

FIG. 2 depicts graphics processor and CIOCP raster scan based DVI signals 218 and 222, respectively, at a moment in time as they scan down the image 216. Graphics processor DVI signal raster scan 218 at position 143 is shown ahead (i.e., further down) image 216 than CIOCP DVI signal raster scan 222. In one or more embodiments, the two DVI signals at each end of the network 106 (i.e., DVI signal 214 and reconstructed DVI signal 220) are synchronized such that the remote client's reconstructed DVI signal 220 is operating at a constant delay from the graphic processor's DVI signal 214. PCIOCP 108 detects the frequency and phase of the graphics processor's DVI signal 214 and communicates such raster scan parameter information to CIOCP 124. CIOCP 124 adjusts the frequency and phase of its reconstructed DVI signal 220 to be locked to the graphics processor DVI signal 214. This is accomplished through a series of acts. As a first act, PCIOCP 108 detects the frequency of the incoming DVI signal 214 (defined by resolution and refresh rate) by measuring the frame rate of the DVI signal 214 to the accuracy of the crystal of PCIOCP 108. PCIOCP 123 communicates the frequency and a tunability range to CIOCP 124. CIOCP 124 uses such data to set its own frequency and range of required tunability.

As a next act, CIOCP 124 receives a first scan line from PCIOCP 108 and initializes a scan line counter. CIOCP 124 begins displaying the image after a predefined number of scan lines have been counted; the total latency between DVI signal 214 and reconstructed DVI signal 220 is then equivalent to the network latency and a predetermined jitter latency determined by the CIOCP scan line counter. In some embodiments, an initial display controller raster position for displaying the image may be determined in accordance with received raster scan parameters and the predefined number of scan lines. Additionally and/or alternatively, the predefined number of scan lines is correlated to characteristics of the network 106, such as a best case latency, a worst case latency, a relationship of packet latency to arrival probability, and/or a relationship of packet latency to bandwidth consumption.

As a next act, the frequency of CIOCP 124 is periodically adjusted within the controllable range in order to lock the frame rates at a predefined lag. CIOCP 124 determines the difference between DVI scan line 214 and display DVI scan line 220 and adjusts its frequency accordingly. If there is insufficient latency between the two scan lines, the display clock frequency is marginally decreased. In cases where the display rate cannot be increased quickly enough (for example to prevent display jitter), incoming packets or frames may need to be dropped. If the latency is too long, the display clock frequency is marginally increased. In an alternative embodiment, CIOCP 124 develops its timing independently.

In some embodiments, for each scan line received from the host system 102, an arrival scan line position is determined at the time of receiving the scan line at the CIOCP 124. The arrival scan line position may be determined relative to a raster position of a display controller within the CIOCP 124 and may comprise a frame number and/or a position within a frame. A scan line difference between the scan line position of the received scan line and the arrival scan line position is then determined for adjusting an operating frequency of a display controller of the CIOCP 124. In some embodiments, the operating frequency is adjusted in accordance with a histogram of scan line differences or a distribution of scan line differences. Additionally and/or alternatively, the operating frequency may be adjusted such that the scan line difference is maintained between a minimum and a maximum threshold.

In some embodiments, the operating frequency of the display controller of the CIOCP 124 is modified by adjusting a balance between a user interaction latency and a frequency of late scan lines, where late scan lines are scan lines that have been received by the CIOCP 124 too late to be able to be displayed.

By synchronizing the DVI signals at the host system 102 and the remote system 104 (both referenced in FIG. 1), the image seen at the display 140 can be exactly the same as an image that would be seen if a display were directly connected to the DVI output of the graphics processor 230 of processor system 122. Changes to the image occur in the same frame sequence at the remote system 104 as they are created and displayed by the graphics processor, thereby minimizing the delay and preventing "tearing" (i.e., an image display problem that occurs when the display frame rate is not synchronized with the image source) and preventing jitter seen in non-real-time systems where frames can be dropped or delayed when the image complexity increases.

With the DVI signals at the host system 102 and the remote system 104 synchronized, the delay or latency caused by communication processing and the network 106 can be managed more effectively. In a remote system configuration where network delay and packet loss are very low, the remote system display is delayed by less than a frame, or only the number of lines necessary to effectively compress the image. If the packet loss is high but the latency is low, the delay is adjusted to allow for retransmission of packets.

The synchronized display structure described above reproduces the desktop experience with no image or frame sequence change and only the delay introduced by the network and the encode and decode time.

Figure 3:
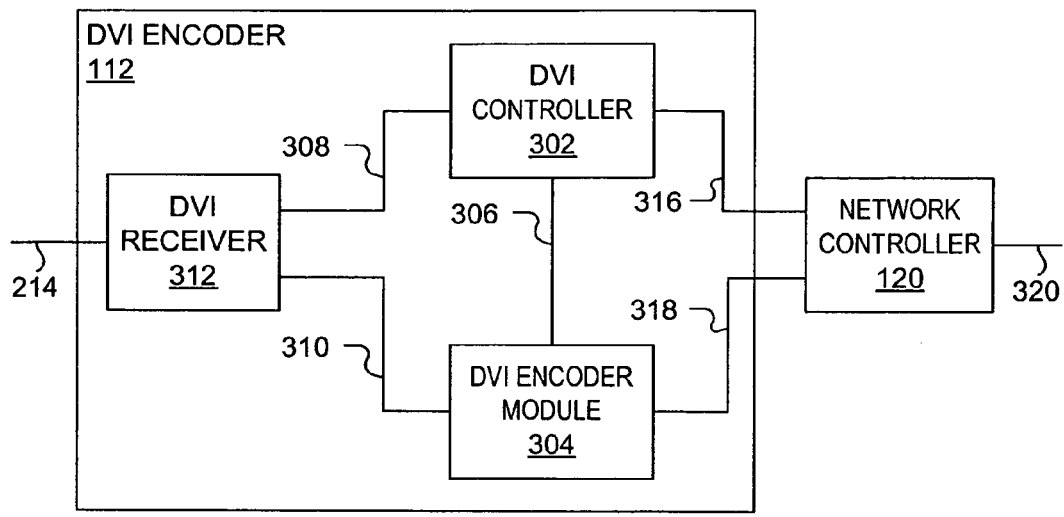
FIG. 3 is a block diagram of a DVI signal compression path within a DVI encoder in accordance with one or more embodiments of the present invention.

FIG. 3 is a block diagram 300 of a DVI signal compression path within a DVI encoder 112 in accordance with one or more embodiments of the present invention. The DVI encoder 112 comprises a DVI receiver 312 coupled to a DVI encoder module 304 and a DVI controller 302. The DVI encoder module 304 is additionally coupled to the DVI controller 302, and the outputs of the DVI encoder module 304 and the DVI controller 302 are coupled to the network controller 120. The DVI encoder 112 is enabled to convert a received raster video signal, such as a received DVI signal, to display control parameters and a plurality of scan lines, where each of the scan lines comprises a scan line position for indicating a display position. In various embodiments, scan line positions are either explicitly defined for image sections comprising one or more scan lines or implicitly defined by the communication protocol or system configuration. In an exemplary case, the image resolution is configured during initialization and scan line boundaries are subsequently derived at the DVI decoder 130 (ref. FIG. 1) from the expected number of pixels in each row.

The DVI receiver 312 receives a DVI signal 214 from the graphics processor 230 of the processor system 122. The DVI receiver 312 converts the DVI signal 214 into clock, video data (i.e., pixel data), and control signals 310 and couples such signals to the DVI encoder module 304. Additionally, the DVI receiver 312 extracts a Display Data Channel (DDC) component from the DVI signal 214 and couples the DDC signal 308 to the DVI controller 302. The PCIOCP 108 and CIOCP 124 utilize the DDC defined in DVI specifications produced by the Digital Display Working Group consortium to provide a bi-directional communication channel for control of the display, allowing a graphics controller within the processor system 122 to operate as if it was connected directly to the display 140. Through such a channel, monitor status and controls are available, including monitor type detection and power saving control.

The DVI encoder module 304 converts the DVI data stream into a stream of encoded pixel data, which is coupled to the network controller 120 for transmission to the remote system 104. The DVI controller 302 manages the DVI encoder module 304 and handles the DDC control. The DVI controller 302 additionally couples control data 316 to the network controller 120 and communicates with the network controller 120 to obtain status information pertaining to the communications network 106 and as a communication channel to a remote DVI controller 402 of the DVI decoder 130.

The DVI encoder module 304 is enabled to compress the received DVI signal in real-time, and may compress the DVI signal losslessly. In some embodiments, the received DVI signal operates between 1.5 and 3.0 gigabits per second. In addition to the pixel data of the DVI signal, the clock and control signals are compressed and transmitted to the remote system 104 so that the DVI pixel data, clock and control signals can be reproduced accurately at the remote system 104. If the communications network 106 cannot provide sufficient bandwidth to transmit the compressed data, the DVI encoder module 304 reduces the data rate by introducing some loss to the compressed DVI signal.

The DVI encoder module 304 achieves a first level of compression by recognizing that the DVI data stream is a two-dimensional image stream. The DVI encoder module 304 looks for change within the image data, and in the absence of change does not send any image data. In the event that a change has occurred in the image data, the DVI encoder module 304 utilizes the two-dimensional image structure to compress the data.

In order to determine if the DVI data stream has changed from one frame to the next and, if a change has occurred, which part of the DVI data stream has changed, the DVI encoder module 304 partitions the DVI data stream and performs a cyclic redundancy check (CRC) on each partition. If a CRC value changes on a partition from one frame to the next, the new DVI signal stream must be encoded and transmitted. The partitions may be defined as rectangular areas to identify typical display image frame changes efficiently and require fewer partitions to be updated in the event of any changes.

Once the partitions of the DVI data stream that need to be encoded have been identified (i.e., the partitions where a change has occurred from the previous image frame), the DVI encoder module 304 utilizes a lossless entropy encoder to reduce the data size. Information identifying those partitions that have changed is also entropy encoded to maximize the compression.

In some embodiments, the DVI controller 302 maintains a sequence number for each partition of the DVI data stream. In the event that any data is lost during network transmission, or for any other reason, sequence information within the compressed DVI data allows the CIOCP 124 to detect such a loss and request corrections from the host system 102. When a replacement for a sequence number is requested by the CIOCP 124 or an acknowledgement of a transmission is missed, the DVI controller 302 determines which DVI data stream partition was lost and commands the DVI encoder module 304 to encode that partition on the next image frame. Such control is accomplished by negating an unchanged indication, such as the CRC, for the lost partition; in alternative embodiments, techniques such as storing and comparing entire frames of DVI data to determine if the DVI stream has changed are utilized. In the event a lost sequence number cannot be found in the partition list, the associated partition has already been retransmitted and no further action is required.

The encoded stream of DVI data 318 ("encoded DVI data 318") comprises a sequence of progressive changes to the original DVI signal received at the DVI receiver 312. The encoded DVI data 318 is utilized to regenerate the original DVI signal 214 without loss at the remote system 104. However, during periods of image motion requiring a great deal of DVI signal data to be transmitted, the communications network 106 may not be able to provide the bandwidth required to reproduce the original DVI signal losslessly. In such cases, the DVI encoder module 304 implements a lossy compression technique to enable transmission over the available network bandwidth.

The DVI encoder module 304 utilizes one of a plurality of possible lossy compression techniques to compress the DVI data stream. For example, a lossy compression technique of skipping frame updates is utilized. Such technique ignores the DVI data for a certain number of frames, thereby reducing the bandwidth required to transmit the encoded DVI data 318. Alternatively, a lossy compression technique of reducing color depth may be utilized; i.e., where the original DVI signal 214 is received as 24 bits of RGB (Red, Green, Blue) pixel data, the color depth may be reduced in steps to one bit greyscale. The color depth used for each partition is recorded, and when additional network bandwidth becomes available the color depth is increased for the recorded partitions. During periods where a particular portion of an image is changing more frequently than the rest of the image, the PCIOCP 108 allocates bandwidth to both improve the quality of the stationary (i.e., unchanged) portions of the image that are lossy encoded as well as bandwidth for the constantly changing portion of the image.

The DVI controller 302 manages the lossy compression techniques to ensure that the image quality reduction at the remote system 104 is below user-perceptible levels whenever possible.

Following the encoding of the DVI signal 214, the resulting encoded DVI data 318 is sent to the network controller 120. The network controller 120 is responsible for assembling the encoded DVI data 318 into packets, along with encoded audio, USB, and/or GPIO data, queuing the generated packets, and transmitting the packets to the remote system 104. In addition to the encoded DVI data stream 318 is information on how long the data is valid for. If the data for a particular partition expires before it is transmitted, the data is not transmitted and the DVI controller 302 is informed that new data needs to be created for that partition.

Figure 4:
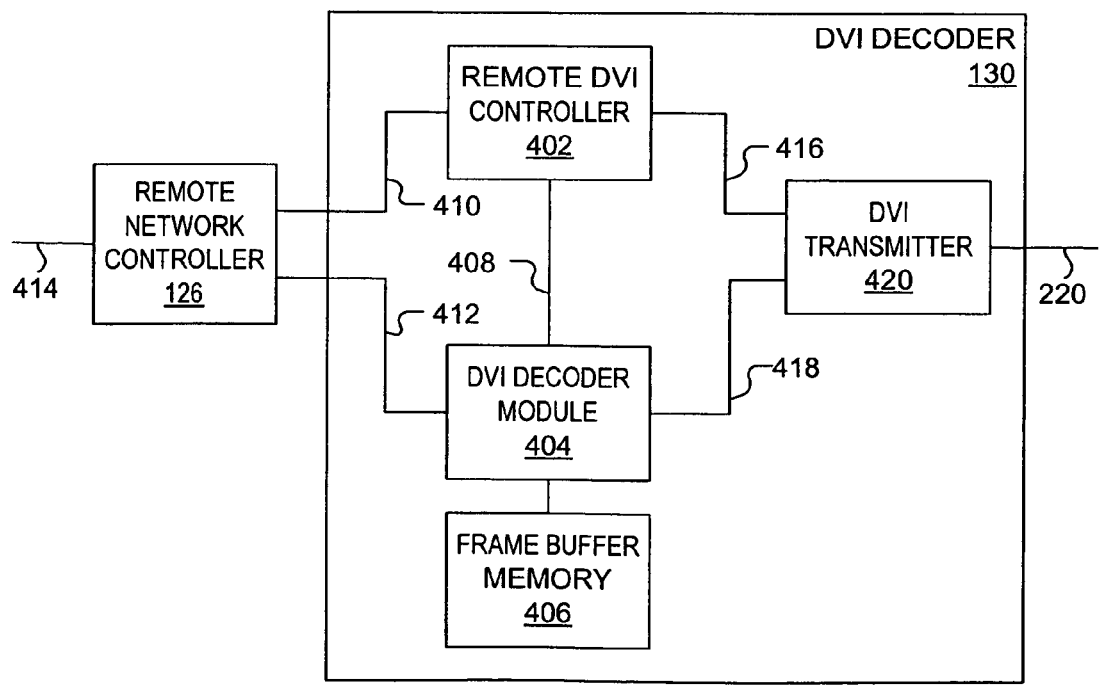
FIG. 4 is a block diagram of an encoded DVI signal decoding path within a DVI decoder in accordance with one or more embodiments of the present invention.

FIG. 4 is a block diagram 400 of an encoded DVI signal decoding path within a DVI decoder 130 in accordance with one or more embodiments of the present invention. The DVI decoder 130 comprises a DVI transmitter 420 coupled to a DVI decoder module 404 and a remote DVI controller 402; additionally, the DVI decoder 130 may comprise a display controller for controlling an output display. The DVI decoder module 404 is additionally coupled to the remote DVI controller 402 and to a framebuffer/memory 406.

The remote DVI controller 402 and the DVI decoder module 404 are coupled to the remote network controller 126. The remote network controller 126 receives the packets 414 sent over the communications network 106 from the PCIOCP 108. The remote network controller 126 monitors received packet sequences and sends information back to the PCIOCP 108 regarding the state of the packet and partition sequence. Such information is sent utilizing an acknowledging protocol with retransmission if a failure occurs. The PCIOCP 108 then utilizes the received sequence information to enact retransmission as previously described.

The remote network controller 126 extracts the control data 410 (comprising the DDC signal) and the encoded DVI data 412 from the received packets; additionally, for each scan line received, the remote network controller 126 may capture an arrival scan line position relative to a raster position of the display controller. The control data 410 comprising the DDC signal is coupled to the remote DVI controller 402, where the DDC signal 416 is recovered and coupled to the DVI transmitter 420. The DVI controller 302 (ref. FIG. 3) and the remote DVI controller 402 communicate status and command information requested and received on the DDC signal so that the processor system 122 (ref. FIG. 1) may operate as if directly connected to the display 140. Capability and status information may be pre-fetched and saved in the DVI controller 302 in order to reduce response time to graphics processor 230 within the processor system 122.

The encoded DVI data 412 is coupled to the DVI decoder module 404 where it is queued for decoding; if the data is received prior to the updated image being required and the queue becomes filled, the queue is extended into the framebuffer/memory 406 until such time the data is needed.

As the reconstructed DVI signal 220 at the remote system 104 is synchronized to the DVI signal 214 of the host system 102, the DVI decoder 130 executes in real-time in order to decode the encoded DVI data 412 as needed. The DVI decoder 130 decodes the encoded DVI data 412 and generates reconstructed signals for clock, video data, and control signals 418, where such signals are a reproduction of the signals 310 from the DVI receiver 312 to the DVI encoder module 304. If the DVI data does not change during a particular image frame or part of the image frame, the previous image frame data is read from the framebuffer/memory 406 for display. The reconstructed clock, video data, and control signals 418 from the DVI decoder module 404 are coupled to the DVI transmitter 420 where they are combined with the DDC signal 416 to generate a reconstructed DVI signal 220 coupled to the display 140. The DVI transmitter 420 may display the reconstructed scan lines of such a recovered DVI signal 220 when associated scan line positions match display scan line positions.

In some embodiments, the DVI decoder 130 may decode a scan line position associated with each received scan line. The DVI decoder 130 may further determine a scan line difference between the scan line position and the arrival scan line position for each received scan line and adjust an operating frequency of the display controller in accordance with at least one scan line difference. Additionally and/or alternatively, the DVI decoder 130 may comprise a display scan line counter enabled to operated at a display controller frequency and generate a periodic raster sequence of display scan line positions.

Figure 5:
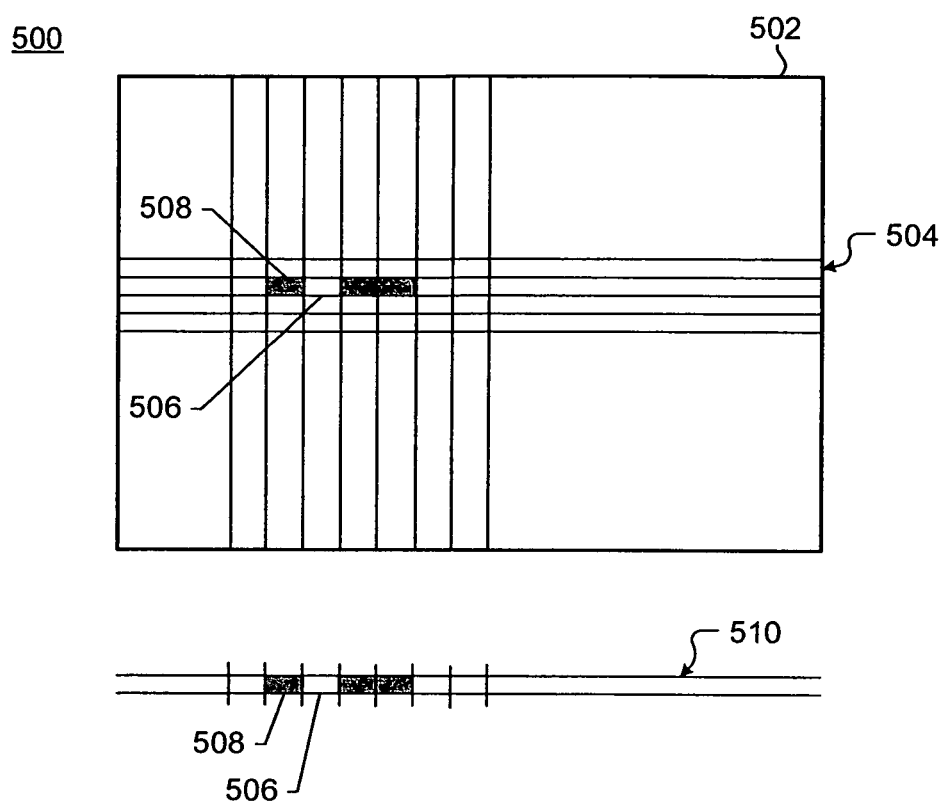
FIG. 5 is a block diagram of a partitioned image in accordance with one or more embodiments of the present invention.

FIG. 5 is a block diagram 500 of a partitioned image 502 in accordance with one or more embodiments of the present invention. The partitioned image 502 may be stored in the framebuffer/memory 406 (ref. FIG. 4), where the memory 406 is partitioned by a grid 504, matching a partitioning used at the PCIOCP 108. For any given frame there may be partitions that require updating, and thereby require new frame partition data 508, and partitions not requiring updating, thereby able to utilize previous frame partition data 506.

The image in the framebuffer memory 406 is transferred through the DVI decoder module 404 to the display 140 as horizontal scan lines of pixels (i.e., a raster scan). As the transfer of a scan line 510 moves left to right through different partitions, selection between previous frame partition data 506 (when updates are not required) or new frame partition data 508 (when updates are required) is made. When updated data (i.e., new frame partition data 508) is used, the updated data must be written to the framebuffer/memory 406 to replace the previous data of the partition requiring updating.

Figure 6:
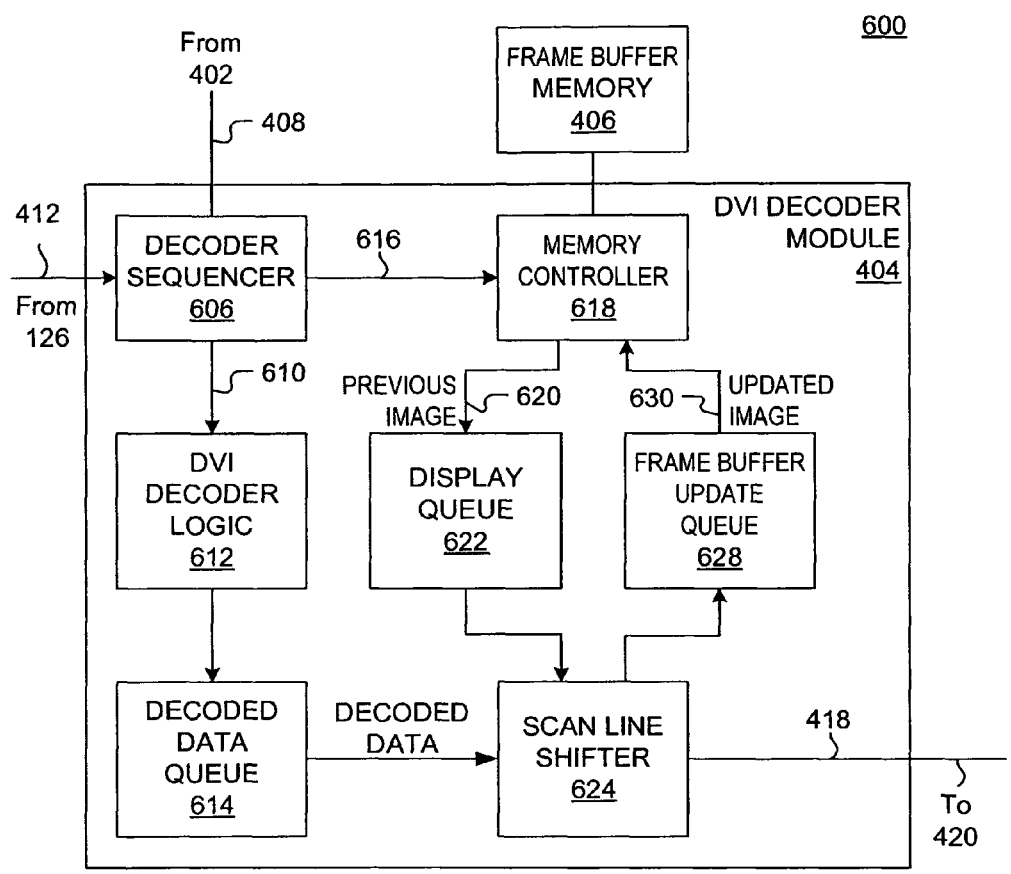
FIG. 6 is a block diagram a DVI decoder module in accordance with one or more embodiments of the present invention.

FIG. 6 is a block diagram 600 of a DVI decoder module 404 in accordance with one or more embodiments of the present invention. The DVI decoder module 404 generates clock, video data and control signals 418 coupled to the display 140. The DVI decoder module 404 comprises a decoder sequencer 606 for receiving encoded DVI data 412 and control data 408 from the remote network controller 126 and the remote DVI controller 402, respectively. The decoder sequencer 606 is coupled to a DVI decoder logic 612 and a memory controller 618; the DVI decoder logic 612 is additionally coupled to a decoded data queue 614. The memory controller 618 is coupled to the framebuffer memory 406; the memory controller 618 further couples a previous image 620 to a display queue 622 and receives an updated image 630 from a framebuffer update queue 628. In addition to being coupled to the memory controller 618, the display queue 622, and the framebuffer update queue 628 are coupled to a scan line shifter 624; the scan line shifter 624 is also coupled to the decoded data queue 614 for receiving decoded data.

Each display line (i.e., scan line) of the display 140 is generated by the scan line shifter 624, which builds the scan line from previous frame partition data 506 (ref. FIG. 5) from the display queue 622 and new frame partition data 508 (ref. FIG. 5) from the decoded data queue 614. When new frame partition data 508 is used, such data is also transferred to the framebuffer update queue 628. When such new data is used to generate the scan line, the memory controller 618 does not need to load data from the framebuffer/memory 406, thus freeing up memory bandwidth to update the framebuffer/memory 406 with updated image data 630. This allows the display and the update of the image to be at a constant memory bandwidth. Any update combination from no partitions to all of the partitions will take the same single operation memory bandwidth, thereby reducing memory requirements for framebuffer/memory 406.

The decision of which data to use is made by the decoder sequencer 606 as it interprets the encoded DVI data 412. The decoder sequencer 606 informs the memory controller 618 as to whether data should be read from or written to the framebuffer/memory 406. As the memory substitution is one for one, the framebuffer addressing of the update data is achieved by queuing the write address when no data is read. The address proceeds through the display queue 622 and is put into the framebuffer update queue 628 when the associated scan line update data is queued.

As previously described, the decoder sequencer 606 temporarily saves the received encoded DVI data 412 in the external memory if the encoded DVI data 412 is received when the local queue is full. In some embodiments, the DVI decoder module 404 is designed to decode a single line at a time. In order to support multi-line partitions for two-dimensional compression, the decoded data queue 614 needs to become larger and more complex. The queue is sufficiently sized to store a full line of data for each additional line used in the compression algorithm.

Although multi-line rectangular partitions are more efficient at identifying what area has changed, the data does not need to be encoded one partition at a time. In some embodiments, multiple partitions are encoded by encoding all the updated partitions one line at a time before encoding the next line.

Figure 7:
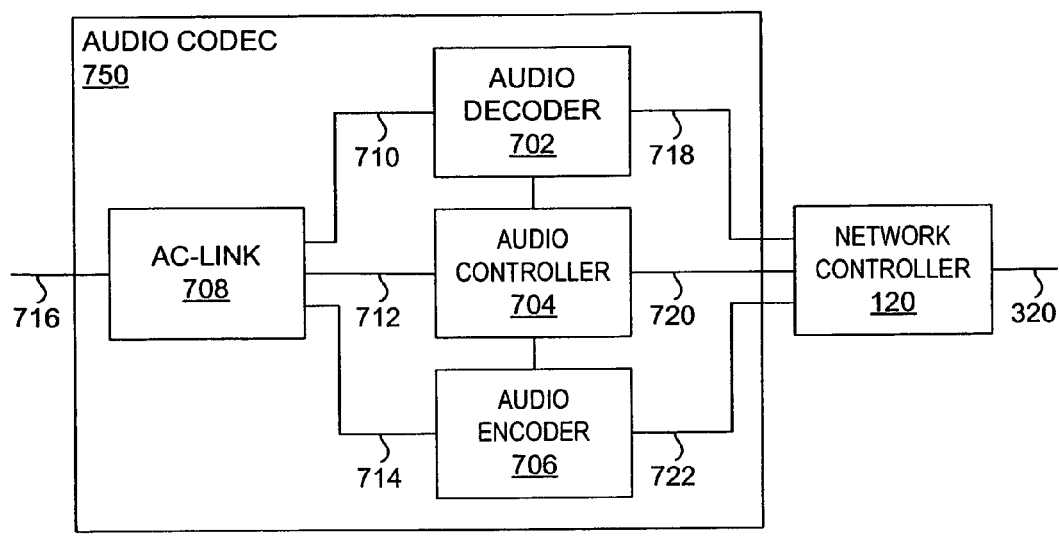
FIG. 7 is a block diagram of an audio codec in accordance with one or more embodiments of the present invention.

FIG. 7 is a block diagram 700 of an audio codec 750 in accordance with one or more embodiments of the present invention. The audio codec 750 is an AC'97 compliant embodiment of audio controller 110 in FIG. 1. The audio codec 750 and remote audio codec 850, described in detail in the FIG. 8 description below, provide an audio bridge to bi-directionally communicate audio signals between audio devices at the remote system 104 and the processor system 122 (i.e., the audio codec 750 and remote audio codec 850 bridge the audio signals between the remote devices and the processor system 122). Additionally, the audio codec 750 and remote audio codec 850 adjust audio quality of the audio signals from lossless to audibly perfect to off depending on available bandwidth, and fill in/filter out gaps in the audio that result from lost packets. The audio codec 750 and remote audio codec 850 allow audio signals to be isolated from other types of I/O data and processed as a media stream. Additionally, the audio data can be prioritized with respect to other I/O data such as image data, keyboard data, mouse data, and the like. Those skilled in the art will recognize that there are a number of different encoding algorithms that may be used to implement lossless or lossy audio compression and manage lost data packets. In accordance with one or more embodiments of the present invention, such encoding methods may be utilized such that the audio bandwidth is adjusted from lossless to off in accordance with the available network bandwidth. The audio codecs 750 and 850 are used as part of the codec interface (i.e., AC' 97) bridging or communication method that includes the supporting control structure in a register compatible solution; additionally, it can be connected directly to an audio bus interface on a computer chip-set without requiring any changes to the software. Additionally, management of the audio stream may be controlled by an administrator to prevent unwanted use.

The audio codec 750 comprises an AC-link 708 that receives standard audio codec interface signals, such as AC-97 compliant signals 716, from the processor system 122. In alternative embodiments, audio codec IC (integrated circuit) interfaces, such as High Definition Audio interfaces, may be used. The AC-link 708 is coupled to an audio decoder 702, an audio controller 704, and an audio encoder 706. The audio controller 704 is coupled to the audio decoder 702 and the audio encoder 706. The outputs of the audio decoder 702, the audio controller 704, and the audio encoder 706 are coupled to the network controller 120.

The AC-link 708 separates command and status data from the PCM audio. The command and status information, i.e., control data 712, is sent to the audio controller 704. At the AC-link 708, output PCM data (i.e., speaker data 714) is sent to the audio encoder 706 and input PCM data, (i.e. microphone data 710) is received from the audio decoder 702. Encoded speaker data 722 from the audio encoder 706 is sent to the network controller 120 for communication over the network 106 to the remote system 104. Microphone data generated at the remote system 104 is received over the network 106 by the network controller 120 and forwarded as encoded microphone data 718 to the audio decoder 702. The audio controller 704 contains AC-97 compliant registers which are managed and mirrored to the AC-97 codec (i.e., remote audio codec 850) at the remote system 104. The network controller 120 communicates with the audio controller 704 to provide control data 720 pertaining to available bandwidth.

The audio encoder 706 can be controlled to encode the speaker data 714 utilizing lossless or lossy compression. The lossless compression utilizes an audio focused entropy encoder while the lossy compression may use a frequency banded audio encoder such as MP3 or the like. In order to operate at different network bandwidths, the audio encoder 706 may combine channels and adjust the number of bands and the quantization of the bands. In the case of insufficient available bandwidth, the audio may be turned off until sufficient bandwidth becomes available. The audio encoder 706 also monitors for periods of silence and halts audio transmission during such periods in order to reduce network bandwidth utilized.

The audio decoder 702 decodes the audio stream (i.e., the encoded microphone data 718) received from the remote system 104, creating a PCM audio stream for the AC-Link 708. The audio decoder 702 includes buffers to manage some of the gaps created by a network connection. The audio decoder 702 can reuse and filter previous audio frame data when packet loss or delay creates discontinuous data. Additionally, the audio decoder 702 includes filters to adjust for frequency differences between host system 102 and the remote system 104.

Figure 8:
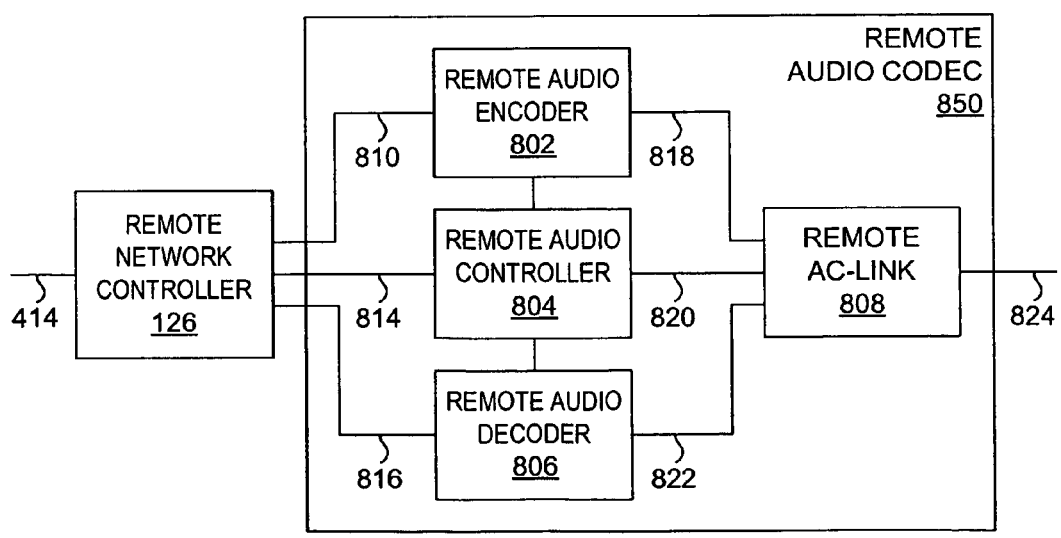
FIG. 8 is a block diagram of a remote audio codec in accordance with one or more embodiments of the present invention.

FIG. 8 is a block diagram 800 of a remote audio codec 850 in accordance with one or more embodiments of the present invention. The audio codec 850 is an AC'97-compliant embodiment of remote audio controller 128 (ref. FIG. 1). The remote audio codec 850 comprises a remote audio controller 804 coupled to a remote audio encoder 802 and a remote audio decoder 806. The remote audio encoder 802, the remote audio controller 804, and the remote audio decoder 806 are each coupled to the remote network controller 126 and to a remote AC-link 808. The remote AC-link 808 is coupled to the speaker 138 and the microphone 136 by connection 824.

The remote audio controller 804 uses a number of the AC-97 register values (received from the audio controller 704) to control the remote audio encoder 802 and the remote audio decoder 806. In some embodiments, the remote audio encoder 802 is coupled through the AC97 codec (i.e., the remote audio codec 850) to an analog source, such as microphone 136, and contains threshold filters to prevent hiss from being transmitted over the network 106 and utilizing unnecessary bandwidth.

Figure 9:
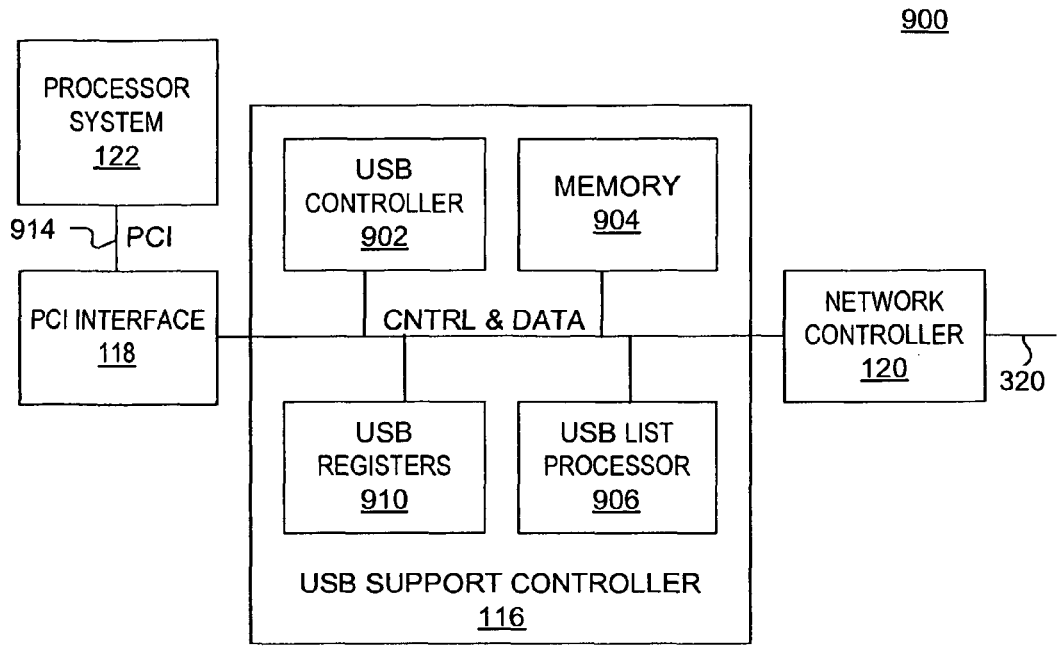
FIG. 9 is a block diagram of a USB support controller in accordance with one or more embodiments of the present invention.

FIG. 9 is a block diagram 900 of a USB support controller 116 in accordance with one or more embodiments of the present invention. The USB support controller 116 and remote USB support controller 134, described in detail in the FIG. 10 description below, provide a USB bridge by presenting industry-standard USB controller interfaces to the processor system 122 and remote USB devices, respectively, for bi-directionally communicating USB data between USB devices at the remote system 104 and the processor system 122 (i.e., the USB support controller 116 and remote USB support controller 134 bridge the USB data between the remotes USB devices and the processor system 122). Additionally, the USB support controller 116 and the remote USB support controller 134 ensure that such a USB bridge is register compatible with an industry-compliant standard USB host controller to the processor system 122, and that standard USB device driver software (i.e., device driver software intended to support locally connected USB devices) can be installed and used when a USB device is connected at the remote system 104. Examples of such industry-compliant standard USB host controller specifications include Open Host Controller Interface (OHCI) specifications, including OHCI specification revision 1.0a published by COMPAQ, National and NATIONAL SEMICONDUCTOR, Enhanced Host Controller Interface (EHCI) specifications, including EHCI Specification Revision 1.0 published by INTEL Corporation, Universal Host Controller Interface (UHCI), Wireless Host Controller Interface (WHCI), or combinations such as combined OHCI/EHCI compliance, including advancements in these or other USB or similar specifications not material to aspects of the present invention.

The USB support controller 116 comprises a USB controller 902, USB registers 910, a USB list processor 906, and an associated memory 904, each coupled to the processor system 122 via a PCI interface 118 and further coupled to the network controller 120. The USB support controller 116 presents a standards-based register set to the processor system 122. The USB list processor 906 is a specialized USB list processor that processes and assembles the USB frame list, transfer descriptors (including USB transfer descriptor contents), and queue heads for transferring over the network 106. The assembled data is sent over the network 106 by the network controller 120 for handling by the remote USB controller 134.

Figure 10:
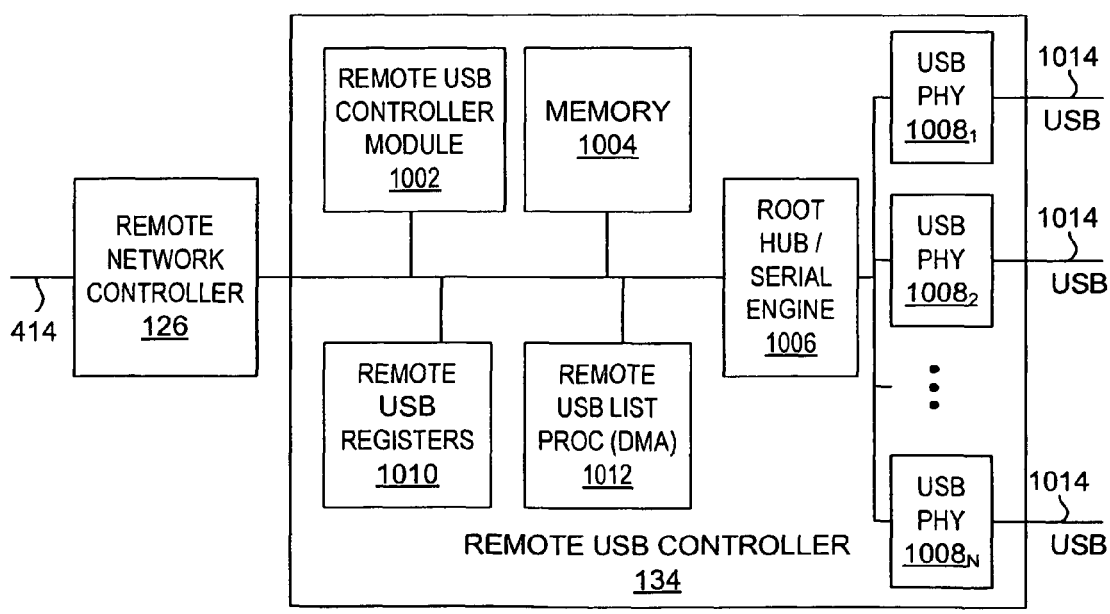
FIG. 10 is a block diagram of a remote USB controller in accordance with one or more embodiments of the present invention.

FIG. 10 is a block diagram 1000 of a remote USB controller 134 in accordance with one or more embodiments of the present invention. The remote USB controller 134 comprises remote USB controller module 1002, remote USB registers 1010, remote USB list processor 1012, memory 1004, root hub and serial engine 1006, and a plurality of USB physical interfaces $1008_1$, $1008_2$, . . . $1008_N$, collectively known as USB physical interfaces 1008. The remote USB controller module 1002, memory 1004, remote USB registers 1010, and remote USB list processor 1012 are coupled to the remote network controller 126 and the root hub/serial engine 1006. The root hub/serial engine is further coupled to each of the plurality of USB physical interfaces 1008.

During operation, packets of transfer descriptors received from the PCIOCP 108 are disassembled and placed in the memory 1004 where they are processed by the remote USB list processor 1012. Upon completion, the transfer descriptor acknowledgements are packetized for transmission back to PCIOCP 108.

In some embodiments, the remote USB controller 134 handles isochronous transfers differently from interrupts, control, and bulk transfers. As isochronous transfers do not provide a guaranteed data transfer, the data uses a FIFO (first-in, first-out) structure to attempt to provide a continuous data flow over the network 106. If packet loss occurs and data is lost, it will be handled in the same manner as lost data on a normal isochronous transfer. Such handling is generally different from interrupt, control, and bulk transfers that use a guaranteed network transfer protocol where the transfer descriptors are not acknowledged until after data transfer is acknowledged.

Alternatively, in other embodiments an external USB host controller is used at the remote system 104. In such embodiments, the remote USB controller module 1002 and memory 1004 are still required, but the remote USB controller module 1002 arranges the descriptors in the memory 1004 such that the external USB controller is able to access and process them.

Figure 11:
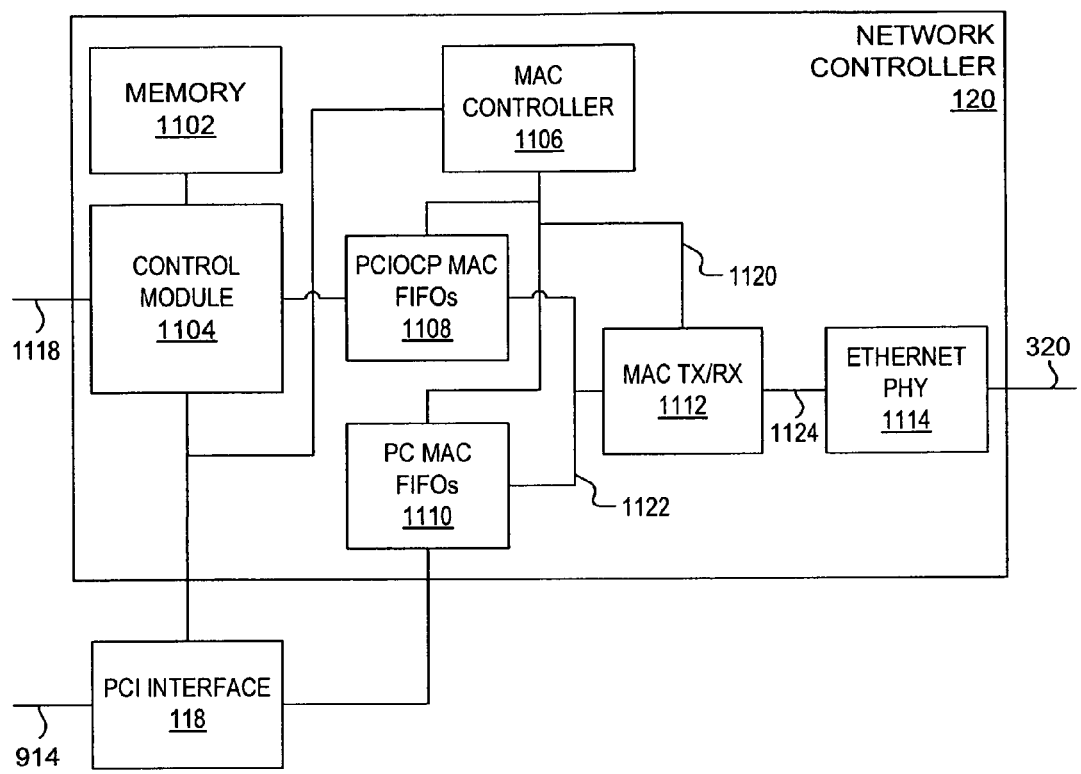
FIG. 11 is a block diagram of the network controller in accordance with one or more embodiments of the present invention.

FIG. 11 is a block diagram 1100 of a network controller 120 in accordance with one or more embodiments of the present invention. The network controller 120 comprises a control module 1104 coupled to PCI interface 118, a memory 1102, a MAC controller 1106, and PCIOCP MAC FIFOs 1108. The MAC controller 1106 is further coupled to the PCI interface 118, the PCIOCP MAC FIFOs 1108, PC MAC FIFOs 1110, and a MAC TX/RX 1112. The PCIOCP MAC FIFOs 1108 are further coupled to the PC MAC FIFOs 1110 and to the MAC 1112; the PC MAC FIFOs 1110 are also coupled to the MAC 1112 as well as the PCI interface 118. The MAC 1112 is coupled to an Ethernet physical interface 1114 for providing the Ethernet signal 320 from the network controller 120 to the network 106.

Data to be sent from the host system 102 to the remote system 104 is sent to network controller 120 with the required control information; such data and control information is stored in the memory 1102. At the time the data is to be transmitted over the network 106, the control module 1104 deposits the data into the PCIOCP MAC FIFOs 1108. The MAC controller 1106 manages the MAC 1112 and additionally controls the transfer of data from the PCIOCP MAC FIFOs 1108 to the MAC 1112. The transmit data is then assembled into Ethernet packets and sent, for example over a Gigabit Media Independent Interface (GMII) 1124, to the Ethernet physical interface 1114 or an external Ethernet PHY for transmission over the network 106. For packets received from the remote system 104, a reverse path through the network controller 120 is used.

The network controller 120 implements the network protocol stack. In the event that packets are lost and require retransmission, such packets may be obtained from the memory 1102. If the packets have expired, the network controller 120 will inform the appropriate codec if required.

The network controller 120 also provides an Ethernet connection for PC digital circuitry within the processor system 122. A PCI signal 914 from the PC digital circuitry connects to the PC MAC FIFOs 1110 through the PCI interface 118. The MAC controller 1106 also manages direct memory access (DMA) controllers in the PCI interface 118 that are used as part of the network controller 120. The MAC 1112 is designed to support two MAC addresses, one for the PCIOCP 108 and the second for the PC digital circuitry.

By integrating the PC MAC with the PCIOCP MAC, the network controller 120 provides a single Ethernet connection, reducing required circuitry and providing a simplified connection of the host system 102 to the network 106. Additionally, all of the I/O from the processor system 122 traverses the PCIOCP 108, allowing the PCIOCP 108 to manage the I/O for security reasons as well as bandwidth considerations. By using the MAC controller 1106 as a common controller for both MACs, the MAC controller 1106 can manage the traffic on both MACs. For example, the MAC controller 1106 may make priority decisions between the MACs and send the appropriate data over the network 106. The MAC controller 1106 has access to the amount of network bandwidth being utilized by the PC digital circuitry and can inform the control module 1104. The control module 1104 may then utilize such information to adjust the available bandwidth to the codecs.

In addition to the codecs described above, the GPIO 114 and the remote GPIO 132 provide a bridge between the host system 102 and the remote system 104 for communicating additional miscellaneous I/O signals not included in the other codecs. Such miscellaneous I/O signals may include a hard disk light, reset control, and similar features available to, for example, a desktop PC. At the PCIOCP 108, the GPIO signals also include management status and control I/O, such as fan speed, which can be used to control or send status to an administrator connected to the network 106. The GPIO 114 is coupled to the PCI interface 118, allowing the GPIO 114 to be used to access devices on a PCI bus of the processor system's PC digital circuitry, such as a SATA controller.

Figure 12:
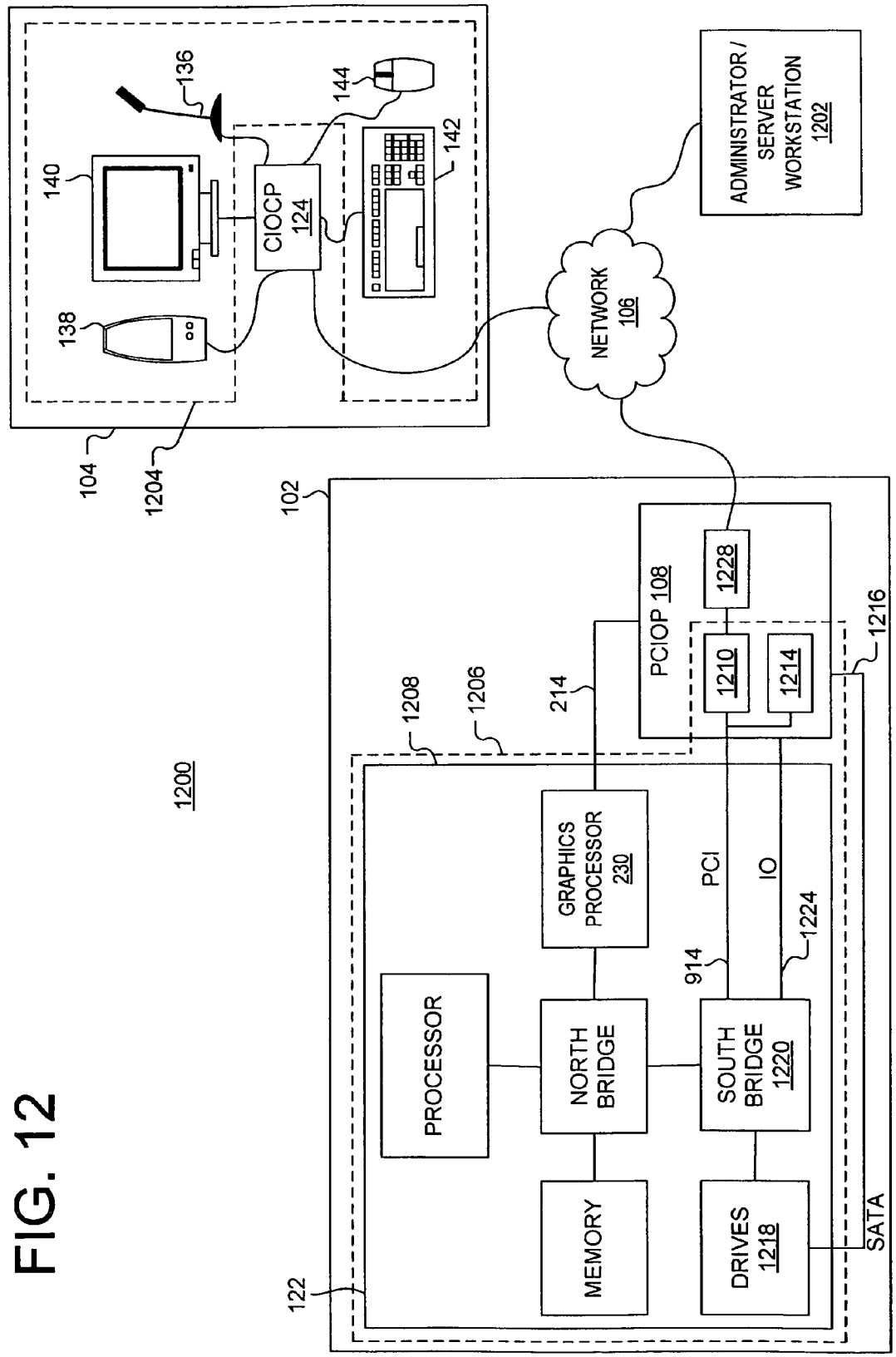
FIG. 12 is a block diagram depicting control ownership within the remote computer user interface system in accordance with one or more embodiments of the present invention.

FIG. 12 is a block diagram of system 1200 depicting control ownership within a remote computer user interface system 100 in accordance with one or more embodiments of the present invention. The remote computer user interface system 100 allows a user to have ownership of all of the I/O, as indicated by the area enclosed by dashed border line 1204 (i.e., remote system user functions 1204), at the remote system 104 that defines the user's environment. As the communication system is not intrusive into the PC digital circuitry 1208, the user can maintain control over all of the capabilities of a standard desktop PC as indicated by the area enclosed by dashed border line 1206 (i.e., host system user functions 1206). An I/O controller 1214, including the USB registers, and the PC MAC FIFOs 1110 within the PCIOCP 108 (ref. FIG. 11) are logically separate from the remaining portion of the PCIOCP 108 and can be controlled by the user. The PCIOCP 108 and the CIOCP 124 form a connection between the host system user functions 1206 and the remote system user functions 1204 in order to provide the user the look and feel of a standard desktop PC. The PCIOCP 108/CIOCP 124 require no specific communication software to be run on the PC digital circuitry 1208 in order to achieve such a connection; as such, remote computer user interface system 100 may be run utilizing any operating system or application that would run on a similarly equipped desktop PC.

As depicted in FIG. 12, all of the I/O from the processor system 122 traverses the PCIOCP 108 prior to being transmitted over the network 106 to the remote system 104, and all of the I/O from remote peripheral devices traverses the CIOCP 124 prior to being transmitted over the network 106 to the host system 102. In such a system, an administrator may control the communication system comprising the CIOCP 124 and the PCIOCP 108, excluding the user I/O controllers 1210 and 1214. As all I/O communications transmit through the administrator owned communication system, the administrator is able to control the I/O. Any I/O information that the communication system extracts from the communication path can be sent over the network 106 to an administrator workstation/server 1202 for logging or authorization. When peripheral I/O devices are coupled to the CIOCP 124, the CIOCP 124 can detect the type of device being connected and request authorization from the administrator's server/workstation 1202. If the device is not authorized, the connection will be disabled and the information will not be forwarded by the CIOCP 124 to the processor system 122. Such operation allows the administrator to control specific types of I/O devices that the user may access. For example, the administrator may allow the user full control of their PC or may lock-down the user to only display, keyboard, and mouse input.

As depicted in FIG. 12, drives 1218 are coupled to the PCIOCP 108 by a Serial Advanced Technology Attachment (SATA) interface 1216; in alternative embodiments, an alternative disk drive interface may provide such connection. A SATA controller may reside within a south bridge 1220 of the processor system 122, where the SATA signals are part of I/O 1224 to the PCIOCP 108. The PCIOCP 108 has the ability to switch out the SATA from the south bridge 1220 and switch in a SATA signal from a SATA controller in the PCIOCP 108, allowing the administrator to image the drives 1218 without requiring any software to be run on the PC digital circuitry. Such imaging may be accomplished utilizing any one of a plurality of methods, such as having the PCIOCP 108 master a PCI/PCI-E bus 914 and use the SATA controller in the south bridge 1220, or having the SATA controller in the PCIOCP 108 as the controller used by the PC digital circuitry using a similar isolation structure to the Ethernet MAC 1228.

Figure 13:
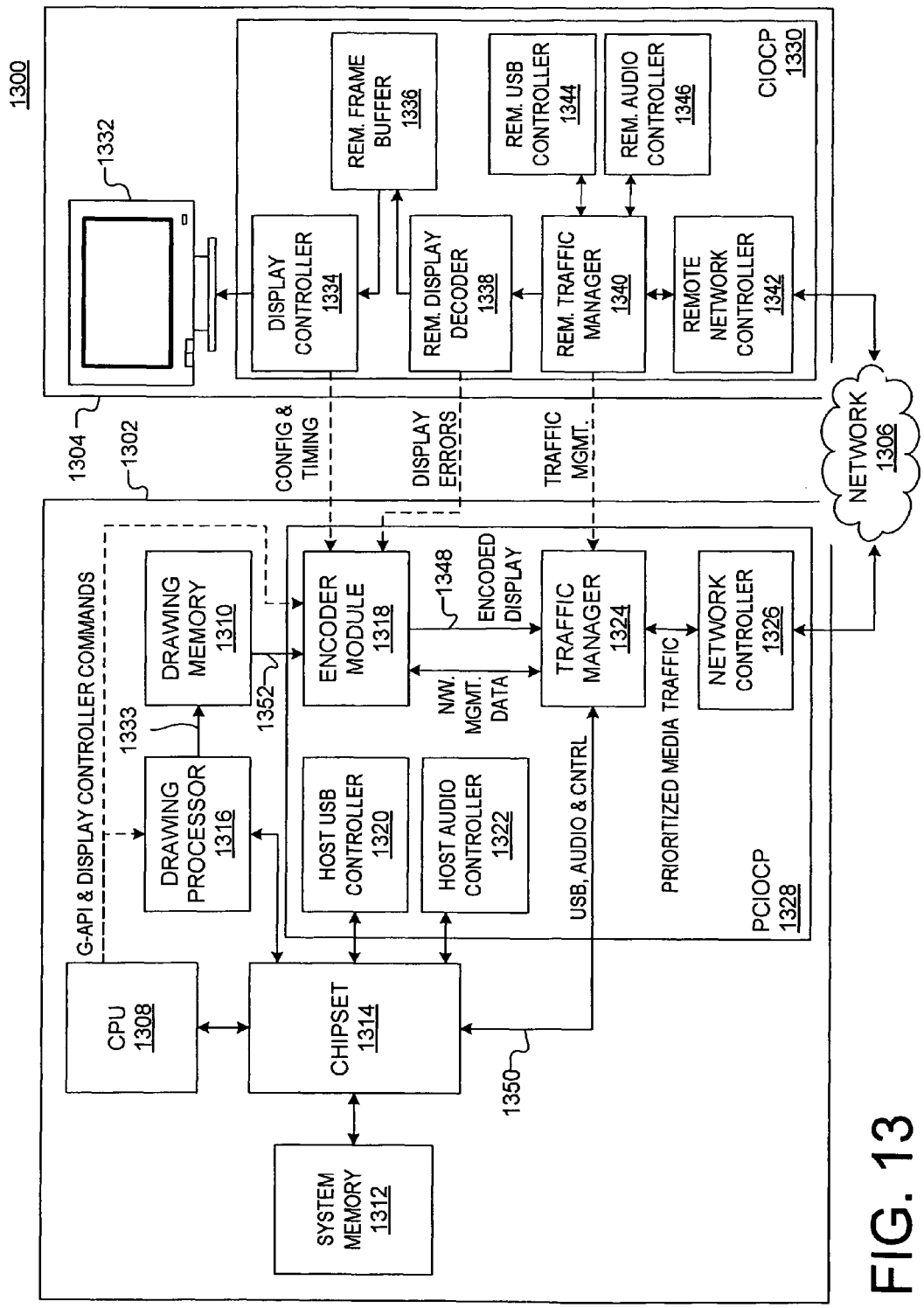
FIG. 13 is a block diagram of a system for aggregating and transmitting display, audio, and USB data between a data processing system and a remote user interface in accordance with one or more embodiments of the present invention.

FIG. 13 is a block diagram of a system 1300 for aggregating and transmitting display, audio, and USB data between a data processing system and a remote user interface in accordance with one or more embodiments of the present invention. Unlike the embodiment of system 1200 (ref. FIG. 12)

where display image information is captured from the output of graphic processor 230, display image information of system 1300 is captured from a shared drawing memory. Display images, such as those from a digital video signal comprising a DVI signal, an HDMI signal, a DPVL signal, a DISPLAYPORT interface signal, or similar type of digital video signal, are rendered to a shared drawing memory by a graphic drawing system on a data processor before being encoded and aggregated. An encoding system monitors drawing commands issued by the CPU and interprets selective commands that enable the optimization of encoding methods.

The system 1300 comprises a host system 1302 communicably coupled to a remote I/O system 1304 ("remote system 1304") by a network 1306; in alternative embodiments, the host system 1302 may be coupled to more than one remote system 1304. In some embodiments, the network 1306 is a computer network comprising a standard IP/Ethernet network and may comprise dedicated cables, wireless networks, LANs, WANs, the Internet, and the like. Host system 1302 is comprised of CPU 1308 connected to system memory 1312 by chipset 1314. In some embodiments, the CPU 1308 may be physically coupled to the drawing processor 1316 and the encoder module 1318; alternatively, the CPU 1308 may be logically coupled to the drawing processor 1316 and the encoder module 1318 via the chipset 1314. Drawing processor 1316 is connected to drawing memory 1310 which incorporates one or more framebuffers; in some embodiments, the drawing processor 1316 may be integrated with chipset 1314 and/or coupled to the encoder module 1318. Drawing memory 1310 may store any information associated with an image representation including image vector or pixel data, attributes, drawing commands, file information or other details pertinent to an image. The CPU 1308, chipset 1314, system memory 1312, drawing processor 1316, and drawing memory 1310 comprise a computing system of the host system 1302 (i.e., a host computing system), where the drawing memory 1310, drawing processor 1316, and chipset 1314 are coupled to a PC I/O communication processor (PCIOCP) 1328.

PCIOCP 1328 comprises encoder module 1318, host USB controller 1320, host audio controller 1322, traffic manager 1324, and network controller 1326. In the embodiment shown, host USB controller 1320 is connected to CPU 1308 and system memory 1312 by chipset 1314. While a single CPU 1308 is illustrated, it is to be understood that alternative embodiments where multiple CPUs are utilized in a cooperative arrangement can also be realized. Host USB controller 1320 is bridged at the buffer management layer (i.e., a USB buffer management layer) with remote USB controller 1344. The buffer management layer provides a synchronized data path that enables the communications of different traffic types, including control and status packets, in addition to packet transport of different USB data types, such as isochronous and bulk data types. Host audio controller 1322 is bridged at the buffer management layer (i.e., an audio buffer management layer) with remote audio controller 1346, thereby providing an audio bridge for synchronized communications of packetized audio data and audio control information between host system 1302 and remote systems 1304. In alternative embodiments, part or all of these functions may be implemented in software on the CPU 1308 or embedded in other host subsystems, including chipset 1314 or encoder module 1318.

In one or more embodiments, encoder module 1318 is connected to drawing memory 1310 so that it can read and encode sections of the display image in drawing memory 1310 in real time. In one or more embodiments, encoder module 1318 has directly addressable access to drawing memory 1310 that is used by drawing processor 1316. In various alternative embodiments, drawing memory 1310 is part of system memory 1312 connected to CPU 1308 or chipset 1314. In some such alternative embodiments, encoder module 1318 accesses the drawing memory 1310 via a system bus, the chipset 1314 and associated memory bus.

In the embodiment shown, encoded display output 1348 from encoder module 1318 is connected to traffic manager 1324, which is further connected to network controller 1326. Traffic manager 1324 aggregates the encoded display data 1348 with other CPU or peripheral traffic, such as audio and/or USB traffic as described below, and forwards the aggregated data to network controller 1326, which manages the transport of network packets from host system 1302 to remote system 1304. Network controller 1326 also receives media streams such as audio, USB, and control messages from remote system 1304 which are forwarded to traffic manager 1324, which in turn passes them to destination host USB controller 1320, audio controller 1322, or, in the case of feedback information related to the videoencoding system, encoder module 1318.

In an alternative embodiment, network controller 1326 and encoder module 1318 are connected to chipset 1314 using the system bus. In this embodiment, encoded display data 1348 and network management data are communicated between network controller 1326 and encoder module 1318 over the system bus. In this embodiment, traffic manager 1324 is not a necessary component of the encoding and transmission system.

CPU 1308 issues drawing commands to drawing processor 1316, which renders display images (reference numeral 1333) in drawing memory 1310. Encoder module 1318 then accesses image sections (reference numeral 1352) from drawing memory 1310 and compresses them using appropriate encoding methods as described below.

In one or more embodiments, the output of encoder module 1318 is connected to traffic manager 1324 as described above. Encoded image sections (i.e., encoded display data 1348) are forwarded from encoder module 1318 to traffic manager 1324 where they are prioritized and multiplexed with audio data, USB data, and other control signals or data from CPU 1308 or local peripherals that are also destined for the remote system (ref signal 1350). Traffic manager 1324 prioritizes the outgoing traffic based on the real-time demands of the image, audio, and USB media streams and the attributes of the present image to ensure perceptually insignificant delays in audio, USB, and video at remote system 1304. As one example, display update information receives higher priority than bulk USB transfers. As a second example, outbound display updates are multiplexed with outbound audio data updates in situations where a portion of the display has been identified as a video sequence. This ensures that a video sequence remains synchronized with its audio channels. As a third example, each traffic type is allocated a fixed maximum bandwidth. In an exemplary embodiment image data is granted 80% of the network bandwidth while audio and USB data are each allocated 10% of the available bandwidth. In select cases where audio data meets its allocated bandwidth, a higher compression ratio is activated. In select cases of bulk USB data meeting its threshold, the USB data is delayed until competing higher priority transfers have completed. In select cases where image data exceeds its bandwidth, a different image encoding method that requires less bandwidth is used. Other methods are also utilized, including real-time allocation to different traffic types based on traffic type and priority.

In various instances, traffic manager 1324 also feeds network availability information back to encoder module 1318 so that suitable encoding methods are selected based on network conditions. This network availability information is determined by at least one of monitoring the bandwidth requirements of inbound and outbound USB and audio streams, monitoring error rates or receiving performance information provided by remote system 1304, or real-time network management equipment. In the embodiment shown, multiplexed media and control streams are encapsulated using an appropriate network protocol, for example UDP/IP in the case of an Ethernet network, and are then forwarded to network controller 1326. Network controller 1326 then manages the physical and link-layer communication of the data streams to remote network controller 1342 in the remote system.

Remote system 1304 comprises client I/O communication processor (CIOCP) 1330 coupled to remote computer display 1332; additionally and/or alternatively, one or more USB peripheral devices and/or one or more audio peripheral devices may be coupled to CIOCP 1330. One or more GPIO devices may also be coupled to CIOCP 1330, such as an activity LED of a storage system, a reset button, and the like. CIOCP 1330 comprises remote network controller 1342, remote traffic manager 1340, remote audio controller 1346, remote USB controller 1344, remote display decoder 1338, remote framebuffer 1336, and display controller 1334. Remote network controller 1342 coupled to remote traffic manager 1340. Remote network controller 1342 manages the physical and link-layer communication of the data streams to and from host network controller 1326. Remote network controller 1342 forwards inbound traffic from network 1306 to remote traffic manager 1340, which reconverts the aggregated streams from host system 1302 into separate audio, USB, and display image streams. Remote traffic manager 1340 is connected to remote display decoder 1338, remote USB controller 1344, and remote audio controller 1346. USB and audio streams are directed by remote traffic manager 1340 to the remote USB controller 1344 and remote audio controller 1346, respectively, and display image data is directed to remote display decoder 1338. Remote traffic manager 1340 also directs host-directed traffic from the remote USB controller 1344 and remote audio controller 1346 to remote network controller 1342 for encapsulation and transfer.

Encoder module 1318 and remote display decoder 1338 provide a video bridge for providing a digital video signal from the host system 1302 to the remote computer display 1332 (i.e., the encoder module 1318 and remote display decoder 1338 bridge the digital video signal from the host system 1302 to the remote computer display 1332). The encoded display data is decoded by remote display decoder 1338 and stored in remote framebuffer 1336 coupled to the remote display decoder 1338; remote framebuffer 1336 is further coupled to the remote display controller 1334. Alternatively, the image is stored directly in framebuffer 1336 in compressed form and decoded by remote display decoder 1338 in real-time as controlled by remote display controller 1334. Remote display controller 1334 accesses the image from framebuffer 1336 and generates a timed display video signal, e.g., Digital Visual Interface (DVI) signal, a DISPLAYPORT signal, an HDMI signal, a DPVL signal, or similar type of signal, which is used to drive remote computer display 1332. The remote display decoder 1338 and the encoder module 1318 provide a display management channel, comprising a display data channel (DDC), between the host system 1302 and the remote system 1304 that allows the remote computer display 1332 to communicate its specifications to the host system 1302.

Network errors and bandwidth availability are managed at various protocol levels by different modules. At the physical and network protocol layers, the transport is managed between network controller 1326 and remote network controller 1342.

In some instances, status of network bandwidth availability is an important parameter for the encoding system. Remote traffic manager 1340 monitors network congestion and availability based on the timing of received packets, sequence numbers and lost packets and periodically signals traffic manager 1324 regarding network and data transfer status. Traffic manager 1324 forwards this status information to encoder module 1318, which is capable of adapting the encoding scheme in real-time based in part on network bandwidth availability. Encoder module 1318 also predicts future network bandwidth requirements based on interpreted drawing commands described in detail below.

At a higher protocol layer, remote display decoder 1338 detects if image sections are corrupt, late or dropped. In these cases, remote display decoder 1338 signals encoder module 1318 that the section should be retransmitted. Encoder module 1318 either retransmits the requested section or an updated version, depending on the availability of refreshed information in the drawing memory 1310.

Figure 14:
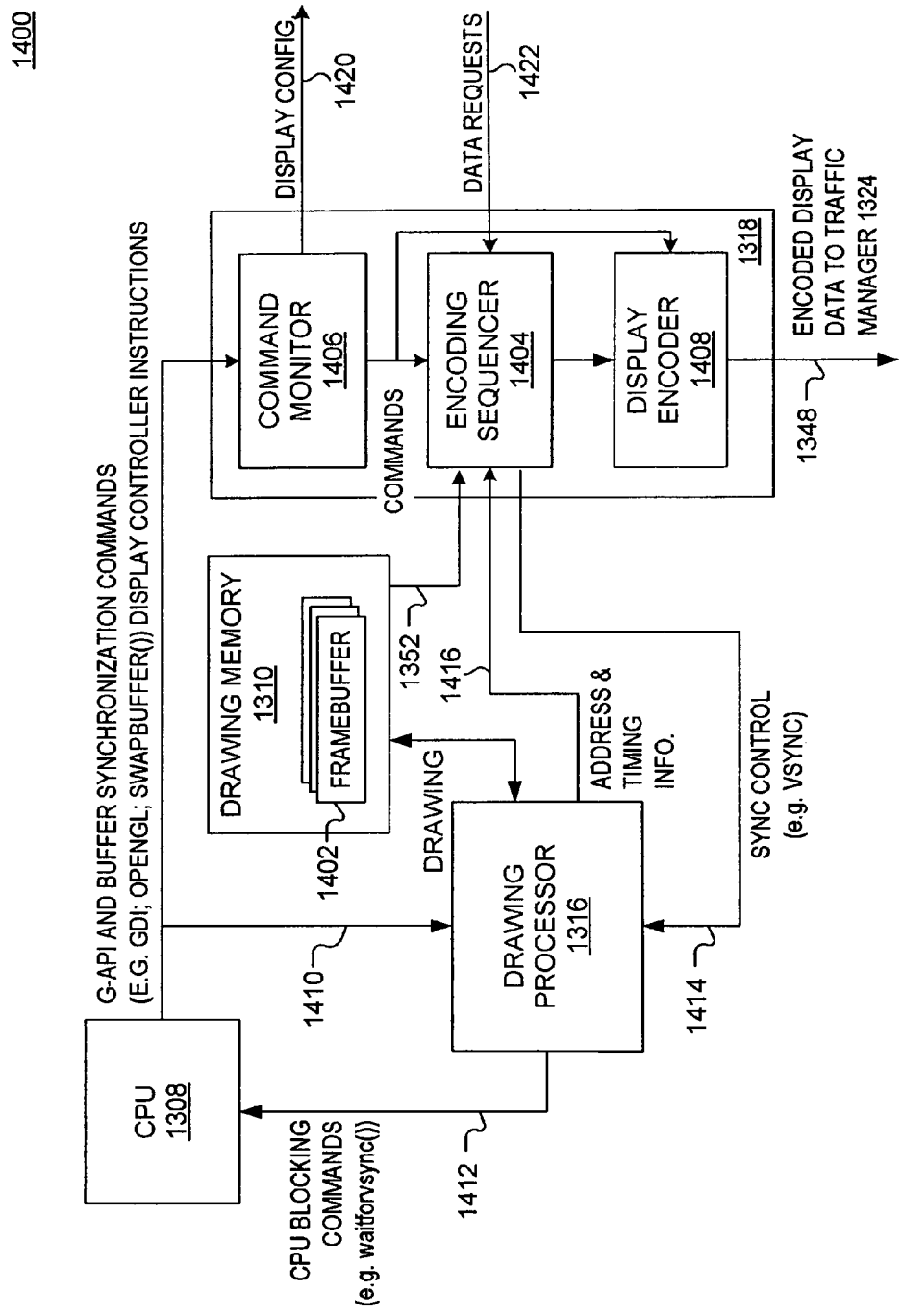
FIG. 14 is a block diagram illustrating image data, drawing command, and timing signal flow between a CPU, a drawing processor, and an encoding system in accordance with one or more embodiments of the present invention.

FIG. 14 is a block diagram 1400 illustrating image data, drawing command, and timing signal flow between a CPU 1308, a drawing processor 1316, and an encoder module 1318 in accordance with one or more embodiments of the present invention. CPU 1308 issues drawing commands to drawing processor 1316, which renders the display image in one or more framebuffers 1402 within drawing memory 1310. Encoder module 1318 reads sections of the memory for encoding. Drawing memory 1310 is connected to drawing processor 1316 by one of several mechanisms. In some embodiments, they are connected by a high-capacity data bus. Alternatively, the graphic drawing system may be a hardware-acceleration function of the chipset 1314 or software function embedded within CPU 1308. In some embodiments, drawing memory 1310 is an area of system memory 1312 illustrated in FIG. 13.

Drawing memory 1310 incorporates one or more framebuffers 1402 that are used by drawing processor 1316 to render and store display image frames. Drawing processor 1316 draws into drawing memory 1310 in the same manner as if an encoding system were not also connected to drawing memory 1310, i.e., the rendering performance of the drawing system is not impacted by the presence of the encoding system.

In some embodiments, encoder module 1318 is comprised of three modules. First, encoding sequencer 1404 is coupled to drawing memory 1310 and drawing processor 1316. Encoding sequencer 1404 has read access to drawing memory 1310 and responds to requests for updated display sections by reading the requested sections from the drawing memory 1310. Second, display encoder 1408 is connected to the output of the encoding sequencer 1404 and compresses sections of the display image using several means described below. An output of display encoder 1408 is connected to traffic manager 1324. Third, command monitor 1406 has access to the drawing commands issued by CPU 1308. In some embodiments, the command monitor 1406 may be a software function executing on the CPU 1308, and/or a dedicated function or functions embedded within encoding sequencer 1404 and display encoder 1408. In various embodiments, the command monitor 1406 is a dedicated hardware module coupled to the CPU 1308, or a hardware or software function (or a combination) embedded within drawing processor 1316 or CPU 1308.

Encoding sequencer 1404 uses synchronized timing means to access pixels, blocks, lines, frames or other sections of image from a framebuffer 1402 in the drawing memory 1310. This access is initiated by any of several mechanisms, including incoming requests 1422 from remote display decoder 1338 (ref. FIG. 13) or locally generated timing. In some embodiments, regions of the framebuffer 1402 are read on request 1422 from remote display decoder 1338 only after drawing processor 1316 has signaled that the rendering of the current frame is complete, using framebuffer timing signal 1416. In an exemplary case, the encoding of a frame is delayed until the completion of a raster operation move, so as to prevent the tearing of the image when it is encoded.

In an alternative embodiment, the drawing command stream rate at which an application on CPU 1308 calls drawing processor 1316 is controlled (e.g., using CPU blocking commands 1412) so that drawing memory 1310 is updated at a rate that matches the image throughput rate. The optimum frame update rate is determined by identifying image throughput bottlenecks. In one embodiment, the bottleneck is identified by comparing the throughput of the drawing, encoding, transmitting and decoding functions and the rate at which drawing command are issued is controlled to match the slowest throughput. In another embodiment, the encoding method is selected so that the transmission rate matches the slowest of the drawing command throughput rate, the encoding rate and the decoding rate.

In some embodiments, framebuffer timing signal 1416 is used to establish the frame update rate used by the encoder. In some embodiments where network bandwidth is unconstrained, framebuffer 1402 is read by encoder module 1318 prior to the drawing processor 1316 flagging the completion of the rendering operation. In this case, encoder module 1318 encodes and transmits the image prior to drawing completion. In these embodiments, encoder module 1318 keeps track of drawing changes that occur after the section of framebuffer 1402 and transmits these changed sections after the drawing processor 1316 signals the availability of the rendered image. The advantage of this method in systems with a high availability of network bandwidth is that even though some data may be transmitted twice, the pre-encoding and pre-transmission of image sections reduces the overall latency between the rendering and remote display operations.

Encoding sequencer 1404 then reads the requested image segment and forwards it to display encoder 1408 for compression. Encoding sequencer 1404 also emulates a local display controller by providing timing signals (e.g., VSYNC signal 1414) for drawing processor 1316. Command monitor 1406 filters drawing commands 1410 issued by CPU 1308 to drawing processor 1316 for useful information that facilitates or optimizes display encoding. Useful information includes an understanding of image type, co-ordinates, image quality, display priority (i.e., latency) and other attributes of the display.

Display encoder 1408 uses this knowledge gained from the drawing commands that have been forwarded by command monitor 1406 and additional knowledge of which areas of the framebuffer 1402 have been updated to compresses image sections or changed areas of the image sections; e.g., an encoding method may be determined based on image type, image changes, and/or display priority as well as available network bandwidth.

Command monitor 1406 also monitors CPU 1308 source commands for display setup parameters, configuration instructions, and timing requirements, including display refresh rates and the like, that would be issued to a local display controller and forwards this information 1420 to remote display controller 1334. Timing requirements are forwarded to encoding sequencer 1404 which uses the information to provide emulated timing for the drawing processor 1316 (e.g., generating VSYNC signal 1414). In cases where the application is blocked based on the completion of drawing operations (e.g., a waitforvsync( ) function call), CPU 1308 is fully abstracted from the fact that the VSYNC is generated by the encoder module 1318. Encoder module 1318 determines the timing of drawing processor 1316 but in the case of a blocking command 1412, the token is returned by the drawing processor 1316 to CPU 1308 on command completion as would normally occur.

In various embodiments, command monitor 1406 initiates a low power state in the absence of drawing commands. For example, the framebuffer access circuit may be temporarily disabled if the framebuffer 1402 is not being updated.

Figure 15:
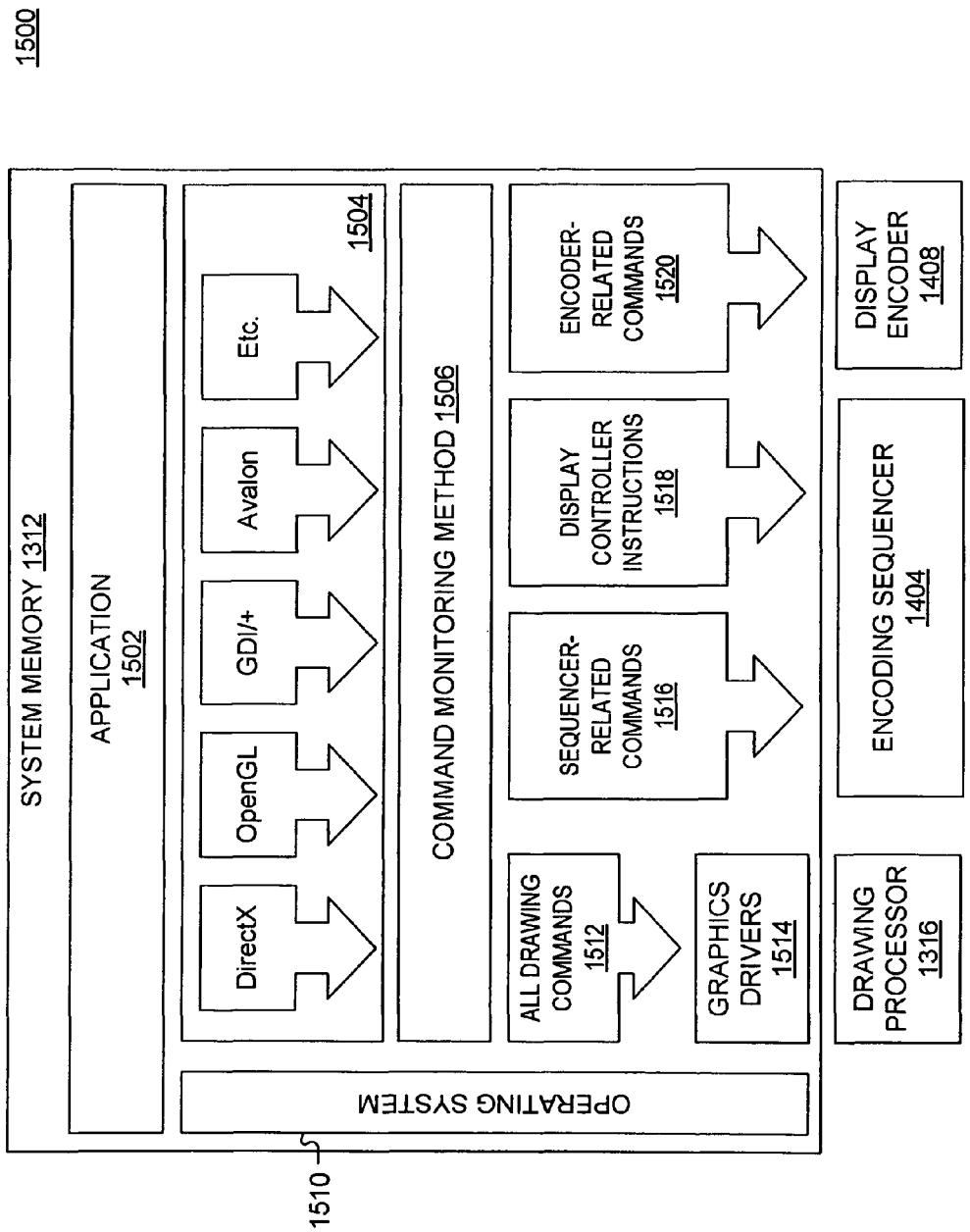
FIG. 15 is a block diagram of a CPU software architecture comprising various software components stored in memory for a host system in accordance with one or more embodiments of the present invention.

FIG. 15 is a block diagram of a CPU software architecture 1500 comprising various software components stored in memory 1312 of a host system 1302 (ref. FIG. 13) in accordance with one or more embodiments of the present invention. The CPU software architecture 1500 enables the monitoring and selective filtering of drawing commands issued by the host application for use by the encoding system. Application 1502 executed by CPU 1308 uses a variety of application interfaces (APIs) 1504 to issue drawing commands 1512 (alternately termed 'graphics instructions') to graphics driver 1514 for drawing processor 1316, either internal or externally to the CPU. These instructions include various graphics drawing instructions from simple and direct pixel placement commands, such as BitBlt( ) to sophisticated 3D shading and lighting commands such as are available in the OpenGL API, or video commands such as those available in Microsoft's DirectShow API that control the properties of video sequences displayed on a computer monitor.

The image is drawn to a framebuffer in the same way as a system without the presence of an encoding system (i.e., as if the remote display 1332 were locally connected). When a drawing API function is called, a graphic instruction is issued to graphics device driver 1514 that interprets the instruction for the specific hardware implementation of the drawing processor 1316. In the embodiment of architecture 1500, an additional command monitoring software processing layer 1506 is included between drawing command API 1504 and graphics driver 1514. The drawing command monitoring method 1506 issues the drawing commands 1512 to the drawing processor 1316 (via the graphics driver 1514) and forwards selective duplicate commands to encoding sequencer 1404 and display encoder 1408.

Command monitoring method 1506 extracts and forwards the essential elements of the drawing commands. Sequencer-related commands 1516 include useful hints based on what part of the image is being drawn while encoder-related commands 1520 describe properties of the image which may influence the selection of encoding method. Command monitoring method 1506 also monitors operating system 1510 for system commands and display setup and display controller instructions 1518 including configuration instructions destined for the display controller 1334. Configuration instructions are forwarded to the display controller 1334 while synchronization instructions that synchronize image updates with the display refresh rate are sent to the encoding sequencer 1404 to enable the appropriate framebuffer 1402 to be encoded, transmitted, decoded and displayed at the remote computer display 1332.

Figure 16:
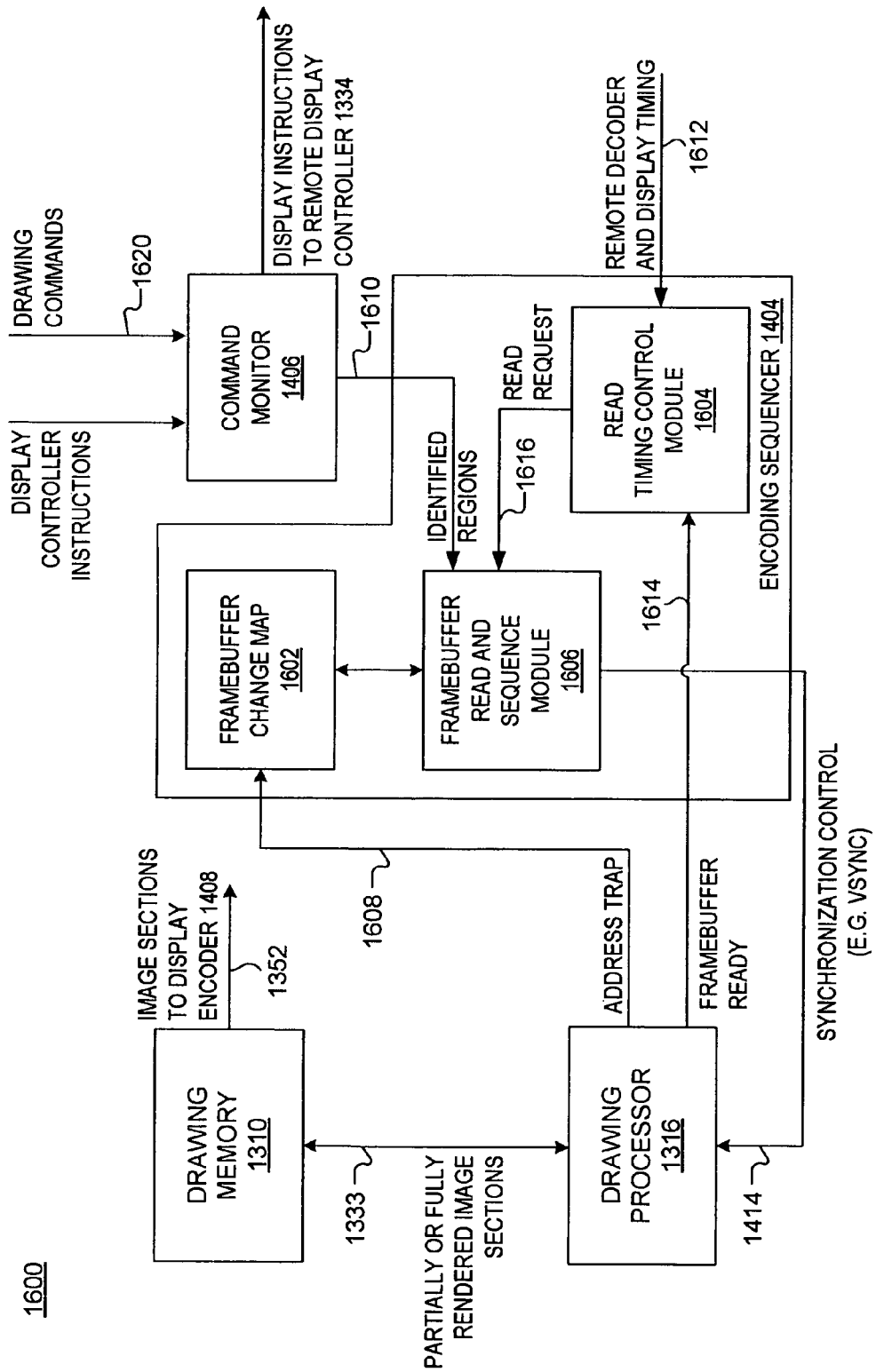
FIG. 16 is a block diagram of an architecture of an encoding sequencer in accordance with one or more embodiments of the present invention.

FIG. 16 is a block diagram of an architecture 1600 of encoding sequencer 1404 in accordance with one or more embodiments of the present invention. The architecture 1600 depicts connections from the encoding sequencer 1404 to other modules and systems that enable encoding sequencer 1404 to replace a raster-based display controller found in a typical local display environment.

In some embodiments, the encoding sequencer 1404 is comprised of three functional modules: framebuffer change map 1602, read timing control module 1604, and framebuffer read and sequence module 1606. Framebuffer change map 1602 is a map of bits corresponding to bitmapped framebuffer locations in the drawing memory 1310. Framebuffer change map 1602 is coupled to drawing processor 1316; when drawing processor 1316 updates a framebuffer 1402, address information is captured (reference numeral 1608) and bits in the map are set to indicate areas or pixels of the framebuffer 1402 that have been updated since the last time that the framebuffer 1402 was accessed by the encoding sequencer 1404. The bits in the map are cleared before the corresponding areas of the framebuffer 1402 have been read. This ensures synchronization and allows the bits to be set again by additional changes before the encoding is complete.

Read timing control module 1604 is coupled to drawing processor 1316 and to framebuffer read and sequence module 1606. Read timing control module 1604 controls the timing of framebuffer accesses. At a system level, the timing is designed to ensure that the encoding function, data transfer, and decoding function are completed just ahead of the associated part of the display image being accessed by the remote display controller 1334 (ref. FIG. 13). This minimizes the latency between the time the image is first written to the host framebuffer 1402 and the time the image is displayed. To accomplish this, read timing control module 1604 generates a timing rate that is an early copy of the remote display controller timing rate by responding to remote requests for updated display sections 1612. When read timing control module 1604 receives a block read request from remote display controller 1334, it signals the framebuffer read and sequence module 1606 that a read operation is due. Framebuffer change map 1602 then indicates pixels in the framebuffer 1402 that have been updated and these may be read. Read timing control module 1604 also receives framebuffer ready flag 1614, asserted by the drawing processor 1316 once a framebuffer 1402 (ref. FIG. 14) has been rendered, for signaling the earliest time that a framebuffer 1402 is available for reading. In one alternative embodiment, reading of the framebuffer 1402 occurs ahead of the ready signal as described above. In another embodiment, this timing information is provided by drawing commands 1620 such as swap-buffers( ) or flush( ) commands, captured by command monitor 1406, and forwarded to encoding sequencer 1404 rather than using hardware signaling between drawing processor 1316 and read timing control module 1604. In another embodiment, read timing control module 1604 makes dynamic timing decisions based on the combination of remote decoder display timing (i.e., remote requests for updated display sections 1612), framebuffer ready flag 1614, and image status information as determined by drawing commands 1620.

A local periodic master timer provides an alternative method for controlling the read timing. In this case, the remote display controller 1334 operates asynchronously to the encoding sequencer 1404 or as a slave to the timing of encoder module 1318.

Framebuffer read and sequence module 1606 is coupled to framebuffer change map 1602, command monitor 1406, and drawing processor 1316, and reads the framebuffer 1402 when instructed by read timing control module 1604. Framebuffer read and sequence module 1606 receives identified image regions 1610 from the command monitor 1406, and reads sections of the framebuffer 1402 identified for access based on framebuffer change map 1602 and interpreted drawing commands. For example, the priority of read operations may be influenced by interpreted drawing commands (e.g., a priority request based on an OpenGL priority hint). Other drawing commands, such as bitblt( ) and scrolling functions, are also useful to framebuffer read and sequencing module 1606 in determining when some areas of the framebuffer 1402 should be read as a priority and which areas should be read so that these updates can occur quickly.

Framebuffer read and sequence module 1606 also generates synchronization signals 1414 for drawing processor 1316 such as the vertical retrace and blanking signals by using the ability of read timing control module 1604 to synchronize with the timing of the remote computer display 1332.

Figure 17:
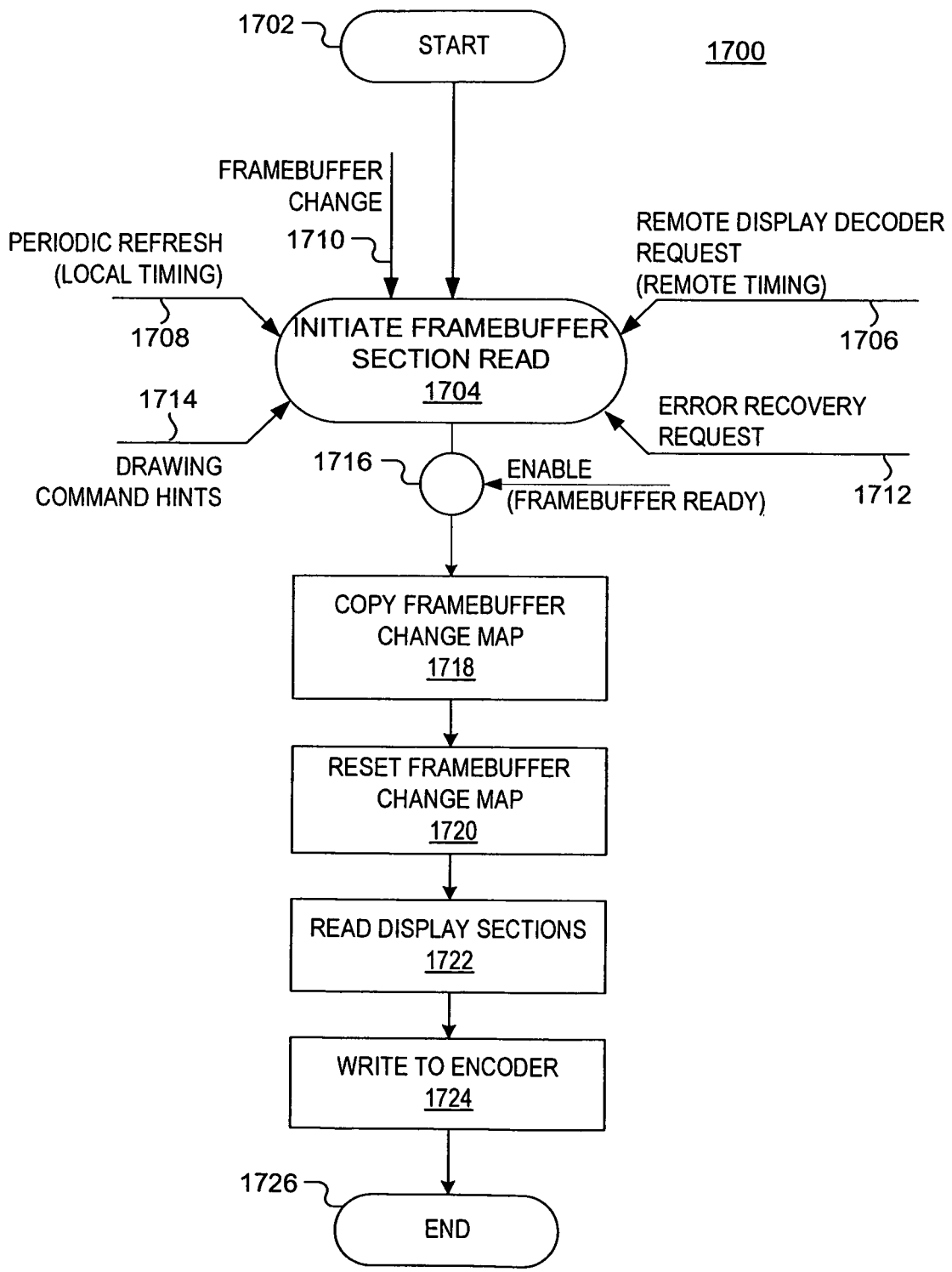
FIG. 17 is a flow diagram of a method for determining access to a framebuffer in accordance with one or more embodiments of the present invention.

FIG. 17 is a flow diagram of a method 1700 for determining access to a framebuffer 1402 (ref. FIG. 14) in accordance with one or more embodiments of the present invention. Encoding sequencer 1404 utilized the method 1700 to determine when sections of the framebuffer 1402 should be accessed. The method 1700 begins at step 1702 and proceeds to step 1704, where framebuffer read operations are initiated by any of several mechanisms. First, a read operation may be initiated by a request 1706 from remote display controller 1334 (ref. FIG. 13) in the case where the remote display controller 1334 is the display timing master. Second, it may be initiated on a periodic refresh request 1708 (e.g., from a local clock or the drawing processor 1316) in the case where encoding sequencer 1404 determines the system timing. Third, initiation may be on a request 1712 from remote display decoder 1338 in the case where an error has been detected for previous transmission. Depending on the nature of the error, retransmission may be limited to previously transmitted data, or recently updated parts of the framebuffer 1402 are read and transmitted, or the entire framebuffer 1402 is read and transmitted.

Additionally, the framebuffer 1402 may be read on a framebuffer change map hit 1710, either on a periodic scan or when the framebuffer 1402 is written. As described, in select instances interpreted drawing command hints 1714 are used to prioritize the sequence of the read function in the case where multiple blocks are available for access.

In some embodiments where drawing processor 1316 is configured to flag encoding sequencer 1404 when the framebuffer 1402 has been written, at step 1716 the framebuffer 1402 is read once a request is received and the framebuffer 1402 has been released by drawing processor 1316 such that it is available for reading. Alternatively, in the case of a host system 1302 with a single framebuffer 1402, encoding sequencer 1404 accesses the framebuffer 1402 asynchronously to the rendering function.

Once initiated, the framebuffer change map 1602 is copied at step 1718 and reset at step 1720. The sections, pixels, lines, blocks or frames identified in the buffer change map copy are then accessed at step 1722, assembled with other information described above and written to the display encoder 1408 at step 1724. The method 1700 then proceeds to step 1726 where it ends.

Figure 18:
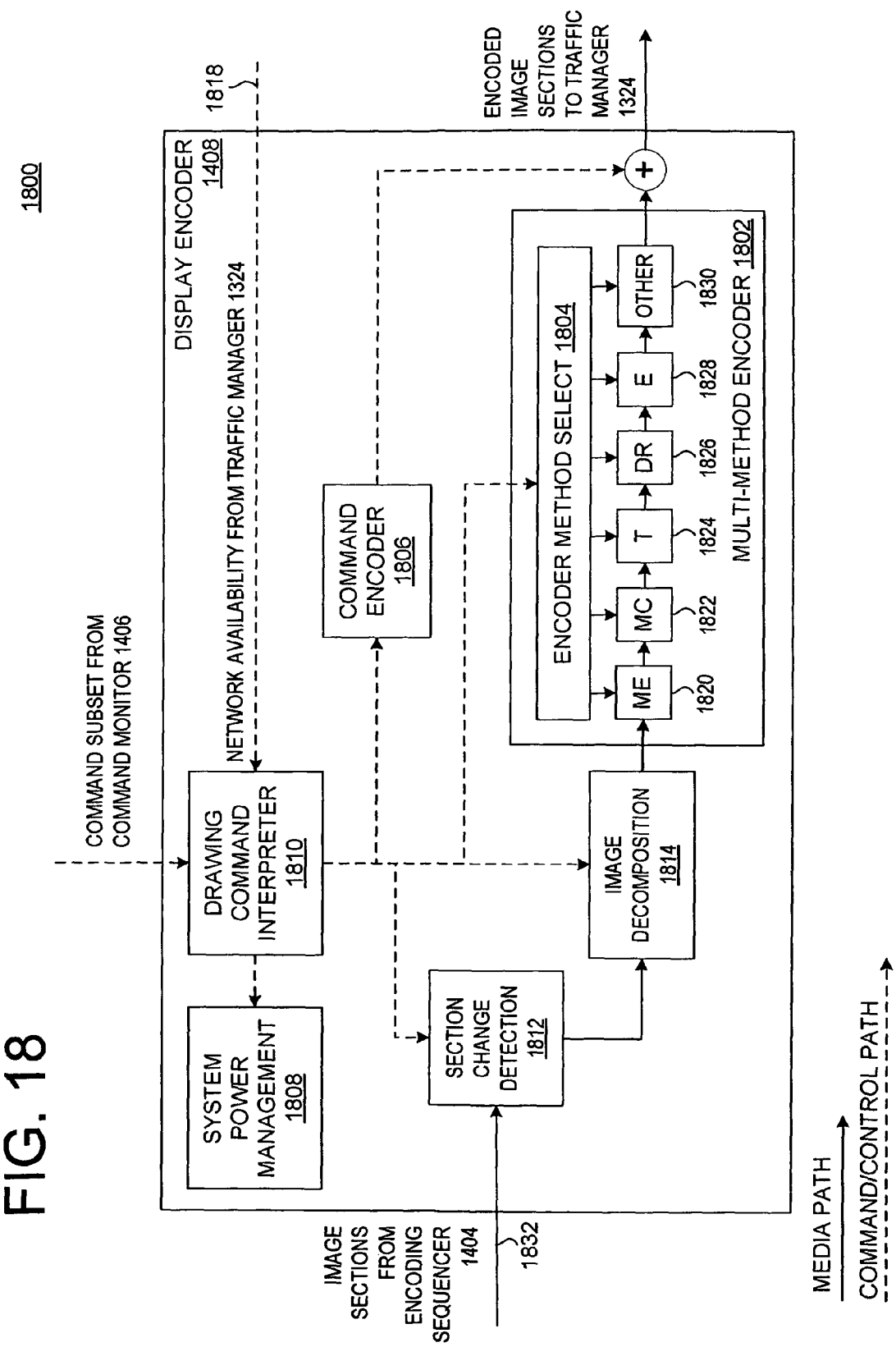
FIG. 18 is a block diagram of a display encoder in accordance with one or more embodiments of the present invention.

FIG. 18 is a block diagram 1800 of a display encoder 1408 in accordance with one or more embodiments of the present invention. The display encoder 1408 decomposes and compresses the display sections based on drawing commands interpreted from the command monitor 1406. The display encoder 1408 is comprised of several modules: multi-method encoder 1802, command encoder 1806, system power management module 1808, image decomposition module 1814, drawing command interpreter 1810, and section change detection module 1812.

Multi-method encoder 1802 is coupled to image decomposition module 1814 and drawing command interpreter 1810. Multi-method encoder 1802 includes an enhanced image encoding pipeline, including motion estimation (ME) 1820, motion compensation (MC) 1822, discrete cosine transform DCT and/or discrete wavelet transform DWT stage (T) 1824, data reordering stage (DR) 1826, entropy (E) encoding stage 1828, and possible other stages 1830. The data reordering stage DR 1826 includes lossless data reordering operations, e.g., color cache, LZW, run length coding, mask or data predictors, and the like. The entropy encoding stage E 1828 uses suitable encoders such as arithmetic, Golomb, or Huffman coders. The stages of the enhanced image encoding pipeline are controlled by encoder method selector 1804 that selects encoding combinations to support different image content, for example lossy methods may be selected for natural images, or lossless methods may be selected for computer generated text or graphic images. The encoder 1802 may also be tunable to different variations in image content such as color depth and the like.

Command encoder 1806 is coupled to drawing command interpreter 1810 and, according to various implementations, is used to transfer some display commands to the remote computer display 1332 rather than processing them locally. One example is the pointer or sprite overlay, which is implemented using the remote display controller 1334 in one such implementation. As a second example, encoder module 1318 encodes one or more pre-defined sub-regions of drawing memory 1310 as determined by interpretation of drawing commands. The sub-regions are transmitted to remote system 1304 with a subset of drawing commands. In this embodiment, remote system 1304 then determines display arrangement details, such as which window should be overlaid. In a variation on this embodiment, predefined sub-regions of drawing memory 1310 from different host systems 1302 are transferred to remote system 1304. Remote system 1304 then determines the integration of display windows from the different host sources.

The display encoder 1408 further includes system power management module 1808 which is configured to shut down or reduce the power consumption of elements of the multi-method encoder 1802 based on framebuffer change activity and the encoding method being used. In one embodiment, motion estimation circuit 1820 is disabled when there is no motion.

Image decomposition module 1814 is coupled to section change detection module 1812 and drawing command interpreter 1810 and is used to facilitate encoding based on image classification. Image decomposition module 1814 classifies the image into different image types, such as background, text, picture or object layers, based on spatial and temporal features such as contrast, color content, and the like. Image type may be determined using image analysis methods or interpreting drawing commands. An example of an image analysis method is an image filter, such as a text detection or text recognition filter. The various image types are then subjected to different encoding methods such as different entropy encoders or context selection for entropy encoders.

Drawing command interpreter 1810 is coupled to command monitor 1406 (ref. FIG. 14), traffic manager 1324 (ref. FIG. 13), and system power management module 1808, and interprets drawing commands that may enhance the image decomposition process. In one embodiment, a drawing command identifies a section of the display as a video sequence which allows the decomposition function to classify the defined region as a picture or natural image region, independent of the contrast features of the region. If the video sequence displays text, in select cases it is desirable to classify the text overlay as either picture or text dependent on other attributes of the video sequence. This enhanced classification is used to optimize the trade-off between image quality and network bandwidth limitations.

In an embodiment, encoder method selector 1804 selects an appropriate encoding method based on various established criteria. Compression is based on the type of image. In some cases, drawing commands are interpreted to understand attributes of the different sections of the display (based on interpreted drawing commands), where sections may have regular or arbitrary pixel boundary shapes. The commands identify areas as background, text, photographs, video, and the like. Each region is then encoded using an optimum encoding method.

Compression is also based on network availability as indicated by traffic manager 1324. Traffic manager 1324 determines network bandwidth based on availability information from remote traffic manager 1340 and feeds this network availability (reference numeral 1818) back to encoder module 1318. Drawing command interpreter 1810 then determines the most effective encoding process based on the combination of the current encoding process, quality requirements, how much of the image is changing as indicated by drawing commands, and the available network bandwidth as indicated by traffic manager information. For example, in one configuration, 10% of the bandwidth availability is allocated to USB traffic, 10% is allocated to audio traffic and the remaining 80% is granted to image data traffic. In such a configuration, the image encoding method is changed when the image data is predicted or measured to exceed its allocated 80% bandwidth.

Based on the desired quality level and the network availability, for example as indicated by traffic manager 1324, one or more suitable encoding methods are selected. For each image type (e.g., picture, video, text, and the like), a lookup table may be used either to determine the bandwidth required (in bits/sec) to achieve a given quality or the quality (in bits/pixel) achievable for a unit of image area using a given bandwidth. In cases where bandwidth is limited due to low network availability or frequent screen changes over a large area, a higher compression mode is selected or a progressive build sequence is used. In the case of progressive build, a relatively low network bandwidth is used to transfer a baseline image or image section of perceptually acceptable quality over a short period of time. Assuming the image or section does not change, more detail is added to the original baseline over time using small amounts of network bandwidth until the image reaches a perceptually lossless quality level. Progressive build methods are typically applied at different times and different rates to different sections of an image dependent on quality requirements and how each section is changing. As a result, at any given time the different sections of an image will be at different progressive build states.

In the case of an actively changing image, knowledge of the area of the image that must be updated and an indication of the type of image provides significant information on how much data will be generated when the changing image is encoded. In select embodiments, this information is used in context with information from the traffic manager to modify the encoder method selection. As one example, a low bandwidth encoding method such as lossy encoding is applied to the changing image in the case of low network availability. As a second example, a higher bandwidth encoding method is applied to the changing image in the case of high network availability.

In an architecture that shares processing resources between drawing and compression functions (for example a CPU architecture with a single graphic processing unit or drawing processor used for both compression and drawing functions), the processing resource is actively balanced between updating the image (e.g., rendering activities) and updating the remote display (e.g., compression activities). The processing load is balanced in such a way as to equalize all processing-based and transmission-based bottlenecks at a minimum level across the data path.

One example is the case where the framebuffer update rate is higher than the frame transfer rate. In this case, the framebuffer update rate is decreased to balance the compression transfer rate. If the same resources are used, lowering the framebuffer update rate typically has the desirable effect of increasing the frame transfer rate. A second example is the case where the framebuffer update rate is lower than the frame transfer rate. In this case the transfer rate is lowered to balance the framebuffer update rate. Similarly, if the same resources are used, lowering the transfer rate typically increases the frame update rate with an overall effect of improving the new frame rate.

Figure 19:
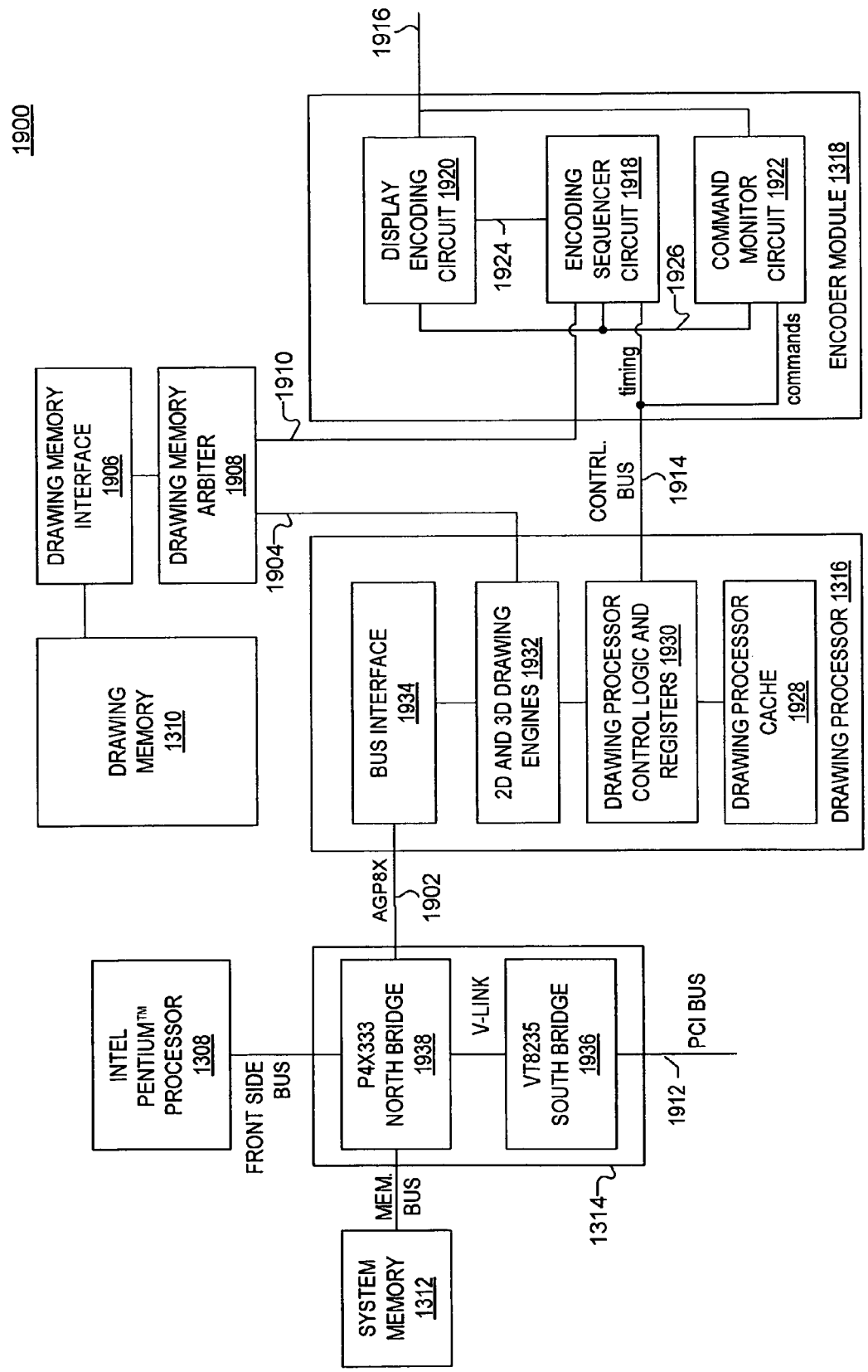
FIG. 19 is a block diagram of a physical embodiment of an encoder module coupled to a drawing processor, a drawing memory, and a CPU chipset in accordance with one or more embodiments of the present invention.

FIG. 19 is a block diagram 1900 of a physical embodiment of an encoder module 1318 coupled to a drawing processor 1316, a drawing memory 1310, and a CPU chipset 1314 in accordance with one or more embodiments of the present invention. FIG. 19 illustrates a hardware circuit implementation of encoder module 1318, where encoding sequencer circuit 1918 is a circuit implementation of encoding sequencer 1404 in FIG. 14, command monitor circuit 1922 is a circuit implementation of command monitor 1406 in FIG. 14, and display encoding circuit 1920 is a circuit implementation of display encoder 1408 in FIG. 14.

In the embodiment depicted, drawing processor 1316 comprises drawing processor cache 1928 coupled to drawing processor control logic and registers 1930, which is further coupled to two-dimensional (2D) and three-dimensional (3D) drawings engines 1932, which is further coupled to bus interface 1934. The bus interface 1934 is coupled to a north bridge 1938 of chipset 1314 by a data bus 1902, such as an accelerated graphics port (AGP) 8× graphics bus. In alternative embodiments, drawing processor 1316 is coupled to chipset 1314 using PCI-Express or other high bandwidth interconnects. Chipset 1314 comprises the north bridge 1938 (such as P4X333 north bridge) coupled to a south bridge 1936 (such as VT8235). The north bridge 1938 is coupled to the system memory 1312, the bus interface 1934, and the CPU 1308, such as an INTEL PENTIUM Processor.

The 2D and 3D drawing engines 1932 of the drawing processor 1316 are coupled to drawing memory arbiter 1908 by image bus 1904. The drawing memory arbiter 1908 is additionally coupled to the encoding sequencer circuit 1918 by image bus 1910, to a drawing memory interface 1906, and the drawing memory 1310. Drawing processor 1316 uses image bus 1904 to write rendered images into drawing memory 1310. As encoding sequencer circuit 1918 also accesses drawing memory 1310, access between the competing resources is arbitrated by drawing memory arbiter 1908.

The arbitration method used is based on the need to satisfy the requirement to grant encoder module 1318 memory access based on its strict timing requirements while also accommodating the variable requirements of drawing processor 1316. In one method of arbitrating between the two resources, drawing processor 1316 is granted a fixed priority and encoder module 1318 is granted a low priority. Encoder module 1318 monitors the actual encoding rate in comparison with the desired encoding rate, as determined by the frame update rate. If the encoding system exceeds a time lag threshold, it signals drawing memory arbiter 1908 to change its priority. In one embodiment, drawing memory arbiter 1908 increases memory burst sizes when encoder module 1318 is granted higher priority but access efficiency is improved utilizing other methods too. Once encoder module 1318 exceeds a lead time threshold, it is once again granted a low priority and burst size is reduced. As a result, encoder module 1318 maintains a desirable memory access priority without impeding drawing processor 1316.

Drawing processor control logic and registers 1930 of drawing processor 1316 is coupled to the command monitor circuit 1922 and the encoding sequencer circuit 1918 by control bus 1914 for communicating timing signals, such as synchronization and control signal 1414 and framebuffer ready signal 1614 previously described, with the encoding sequencer circuit 1918. Control bus 1914 also carries drawing commands 1620 and display controller instructions captured by command monitoring method 1506 destined for command monitor circuit 1922. As previously described, these commands typically originate from CPU 1308. Drawing processor 1316 receives such commands across data bus 1902 and forwards them to command monitor circuit 1922. In an alternative embodiment, drawing commands are stored in drawing memory 1310 and are directly accessible by command monitor circuit 1922.

The memory bandwidth utilization between encoder module 1318 and drawing memory 1310 is lowered using one or more of several available methods described. As one approach, fewer memory read transactions are required as a consequence of consulting framebuffer change map 1602. As described, framebuffer change map 1602 indicates which memory areas have been updated so that memory areas that have not changed do not need to be re-read. Another method involves the interpretation of drawing commands by command monitor 1406. Drawing commands provide an indication of the type of image in a given area and how it is changing. Framebuffer read and sequence module 1606 is then configured to limit memory access based on status information. As one example, a rapid changing video sequence is read at a reduced frame rate. Another method for reducing memory bandwidth takes advantage of drawing processor cache memory 1928. In some applications, such as video sequences that occupy a large display area, the rendering function demands a high proportion of the available bandwidth of image bus 1904. In some such applications, it is desirable to reduce the competing bandwidth requirements of encoder module 1318. One method to achieve this is to provide encoder module 1318 with access to drawing processor cache memory 1928. In such an embodiment, image sections are encoded directly from drawing processor cache memory 1928 rather than external drawing memory and this reduces maximum bandwidth requirements of memory interface 1906.

Figure 20:
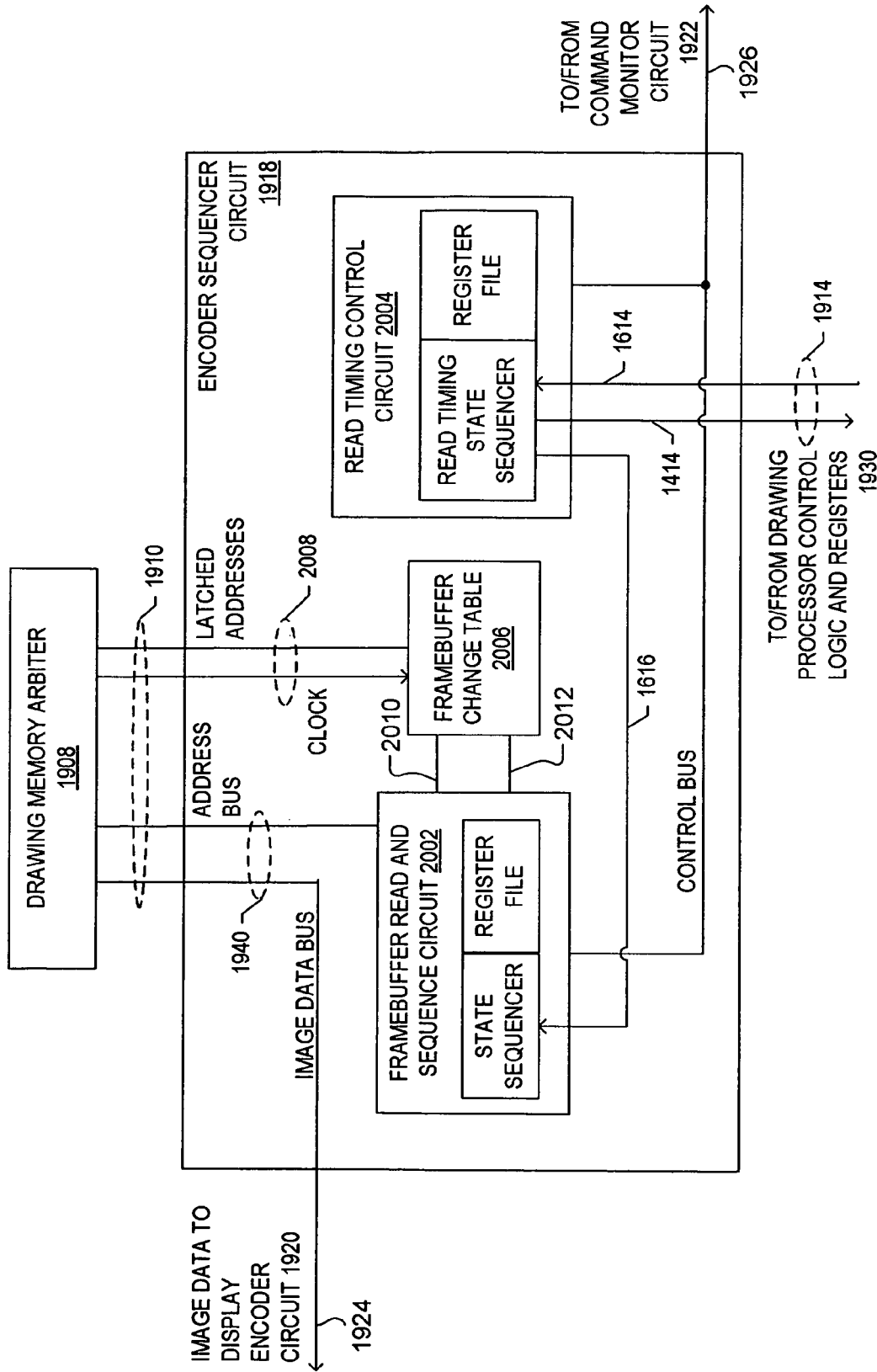
FIG. 20 is a block diagram of a physical view of an encoding sequencer circuit in accordance with one or more embodiments of the present invention.

FIG. 20 is a block diagram 2000 of a physical view of an encoding sequencer circuit 1918 in accordance with one or more embodiments of the present invention. The encoding sequencer circuit 1918 comprises a framebuffer read and sequence circuit 2002 coupled to a framebuffer change table 2006, a read timing control circuit 2004, and the drawing memory arbiter 1908. The framebuffer change table 2006 is additionally coupled to the drawing memory arbiter 1908, and the framebuffer read and sequence circuit 2002 and the read timing control circuit 2004 are coupled to the command monitor circuit 1922 (ref. FIG. 19). The read timing control circuit 2004 is further coupled to the drawing processor control logic and registers 1930 (ref. FIG. 19). Framebuffer read and sequence circuit 2002 is a hardware circuit implementation of framebuffer read and sequence module 1606 in FIG. 16, framebuffer change table 2006 is a hardware circuit implementation of framebuffer change map 1602 in FIG. 16, and read timing control circuit 2004 is a hardware circuit implementation of read timing control module 1604 in FIG. 16, all previously described.

When drawing processor 1316 updates areas of drawing memory 1310 (ref. FIG. 13), framebuffer change table 2006 latches the accessed addresses across bus 2008 and stores them, for example in a single bit table. In an embodiment where multiple remote displays are supported, a bitmap is allocated for each remote display which enables traffic manager 1324 (ref. FIG. 13) to explicitly track information on which displays have received which update information. The added bitmap support for tracking of updates to multiple displays allows the implementation of equitable bandwidth and encoder resource sharing methods as well as transmission prioritization based on image content attributes.

Command monitor circuit 1922 uses control bus 1926 to write the description of identified image regions (previously described 1610) to the register file of framebuffer read and sequence circuit 2002. In response to read request command 1616 from read timing control circuit 2004, framebuffer read and sequence circuit 2002 accesses framebuffer change table 2006 from bus 2010 to determine which sections of the image have changed. Framebuffer read and sequence circuit 2002 reads the relevant sections of drawing memory 1310 using image bus 1910 and resets the framebuffer change table 2006 using reset signal 2012. In an embodiment where multiple displays are supported, only the bitmap relating to the current display is reset. Image data is read directly into display encoding circuit 1920 (ref. FIG. 19) across image bus 1924 shown.

Read timing control circuit 2004 uses a state sequencer to generate timing control signal 1414 for drawing processor 1316 and a read timing signal (i.e., read request command 1616). Timing requirements are derived from remote decoder timing requests written across control bus 1926 to the register file of read timing control circuit 2004 (1612 previously described) as well as framebuffer ready signal 1614 in the case of an embodiment with multiple framebuffers.

Figure 21:
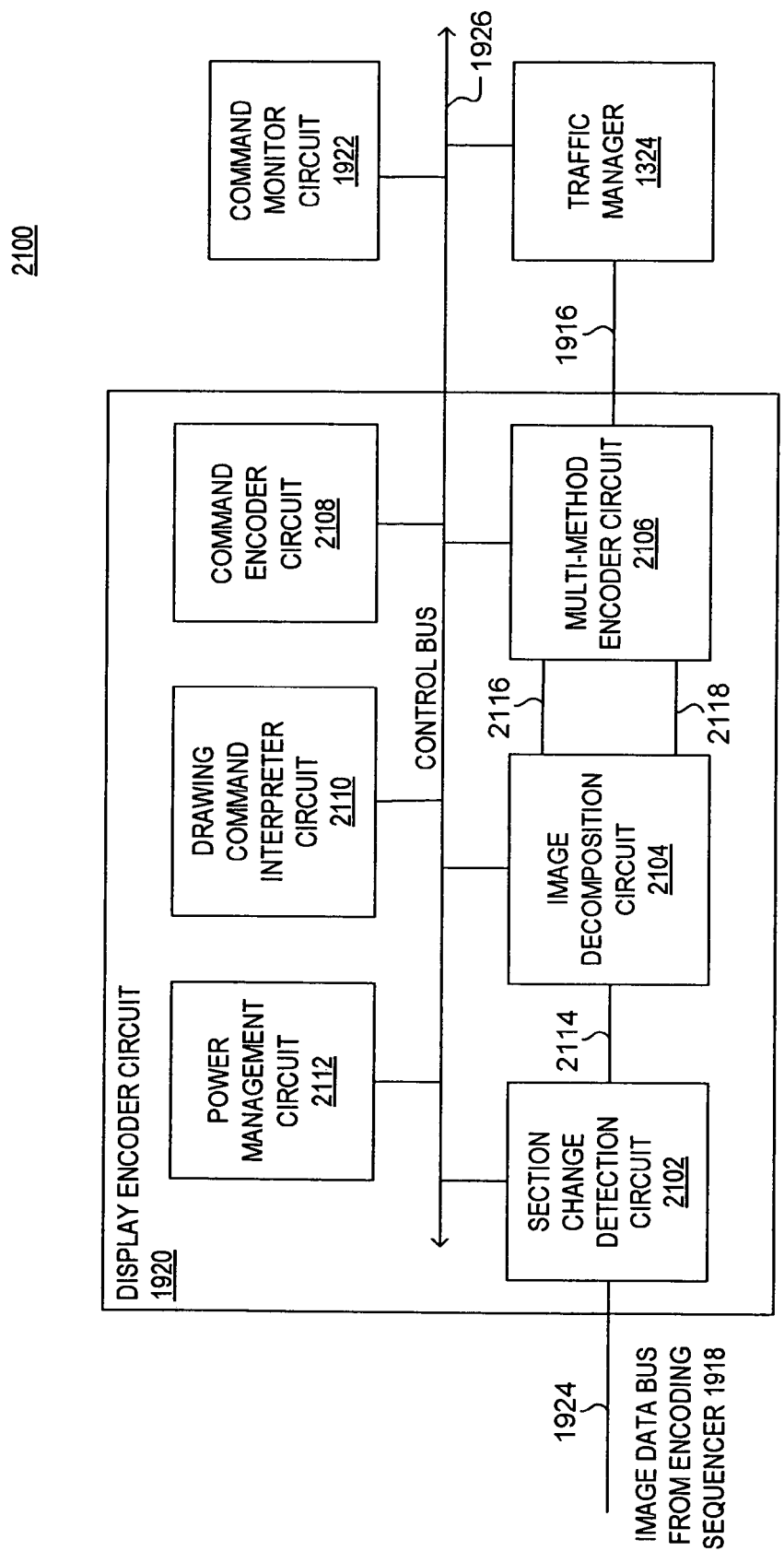
FIG. 21 is a block diagram of a physical view of a display encoder circuit in accordance with one or more embodiments of the present invention.

FIG. 21 is a block diagram 2100 of a physical view of a display encoder circuit 1920 in accordance with one or more embodiments of the present invention. The display encoder circuit 1920 comprises a section change detection circuit 2102, an image decomposition circuit 2104, a multi-method encoder circuit 2106, a power management circuit 2112, a drawing command interpreter circuit 2110, and a command encoder circuit 2108, each coupled to the control bus 1926. The section change detection circuit 2102 is coupled to the encoding sequencer circuit 1918 of FIG. 19 (via data bus 1924) and the image decomposition circuit 2104. The image decomposition circuit 2104 is further coupled to the multi-method encoder circuit 2106, which is further coupled to the traffic manager 1324 (via data bus 1916). The section change detection circuit 2102 is a hardware circuit implementation of section change detection module 1812 in FIG. 18, image decomposition circuit 2104 is a hardware circuit implementation of image decomposition module 1814 in FIG. 18, multi-method encoder circuit 2106 is a hardware circuit implementation of multi-method encoder 1802 in FIG. 18, command encoder circuit 2108 is a hardware circuit implementation of command encoder 1806 in FIG. 18, and drawing command interpreter circuit 2110 is a hardware circuit implementation of drawing command interpreter 1810 in FIG. 18.

Incoming commands from command monitor circuit 1922 are interpreted by drawing command interpreter circuit 2110 and distributed across control bus 1926 to one or more of system power management circuit 2112, section change detection circuit 2102, image decomposition circuit 2104, multi-method encoder 2106, and command encoder 2108. Drawing command interpreter circuit 2110 also receives network availability information (1818 previously described in FIG. 18) from traffic manager 1324 across control bus 1926. In the embodiment of block diagram 2100, change detection circuit 2102 reads updated image sections across data bus 1924 when the relevant sections are addressed by encoding sequencer circuit 1918 as described above. The image is encoded by the image processing pipeline comprising circuits 2102, 2104, and 2106 using methods previously described in regards to FIG. 18. Encoded image data is then forwarded to traffic manager 1324 across data bus 1916.

Figure 22:
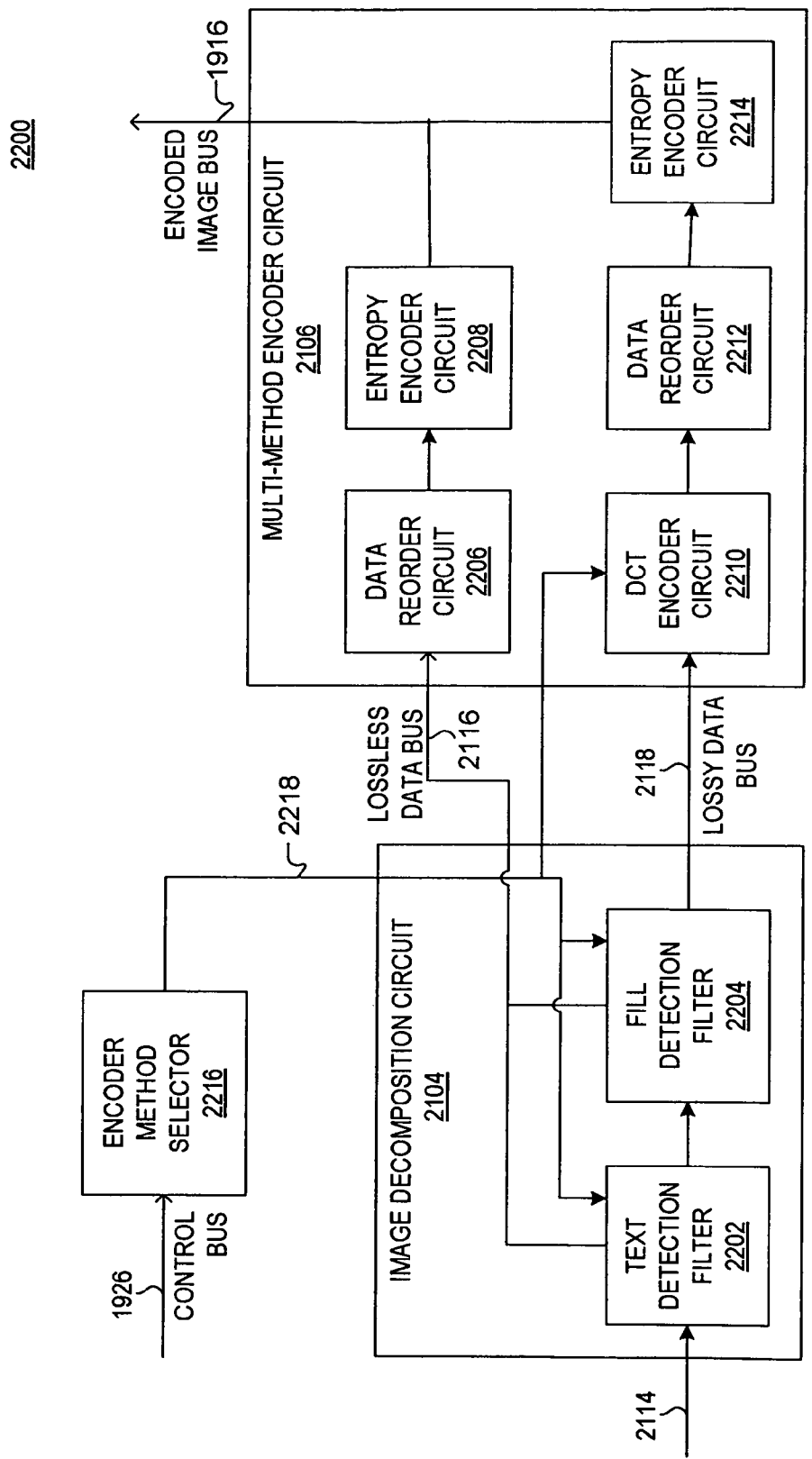
FIG. 22 is a block diagram of an image decomposition circuit and a multi-method encoder circuit in accordance with one or more embodiments of the present invention.

FIG. 22 is a block diagram 2200 of an image decomposition circuit 2104 and a multi-method encoder circuit 2106 in accordance with one or more embodiments of the present invention. The image decomposition circuit 2104 comprises a text detection filter 2202 coupled to a bus 2114 and to a fill detection filter 2204. The multi-method encoder circuit 2106 comprises a discrete cosine transform (DCT) encoder circuit 2210 coupled to a data re-order circuit 2212, which is coupled to an entropy encoder circuit 2214. In other embodiments, circuit 2210 is replaced with one or more alternative encoders such as a wavelet encoder known to the art. Additionally, a data re-order circuit 2206 is coupled to an entropy encoder circuit 2208. The data re-order circuit 2206 is coupled to the text detection filter 2202 and the fill detection filter 2204 via a lossless data bus 2116, and the DCT encoder circuit 2210 is coupled to the fill detection filter 2204 via a lossy data bus 2118. Both entropy encoder circuits 2208 and 2214 are coupled to an encoded image bus (i.e., the data bus 1916). Additionally, an encoder method selector 2216 is coupled to the control bus 1926 and further coupled to the text detection filter 2202, the fill detection filter 2204, and the DCT encoder circuit 2210 via a control bus 2218.

Image blocks are read by decomposition circuit 2104 on bus 2114 and passed through text detection filter 2202. In one embodiment, text detection filter 2202 includes 3-pixel, 4-pixel, and 5-pixel pattern detection elements that detect high contrast areas of the image block and marks identified areas as text. In such an embodiment, pixels that are not identified as text are passed through fill detection filter 2204 which identifies contiguous rectangular regions of identical color as background fill. Areas identified as text or fill are then passed on lossless data bus 2116 to data reordering circuit 2206, where they are re-ordered in preparation for lossless entropy encoding. Areas neither identified as text nor fill are read across lossy data bus 2118 by DCT encoding circuit 2210 where the blocks are compressed using conventional lossy DCT encoding methods, reordered by data re-order circuit 2212, and encoded by entropy encoding circuit 2214. Both lossy and lossless encoded data sets are forwarded across encoded image bus 1916 to traffic manager 1324.

Multi-method encoder circuit 2106 uses drawing command hints to improve encoding as previously described. In the embodiment shown, encoding method selector 2216 sets encoding parameters for the filters and encoders shown by writing to control registers of the circuits across control bus 2218.

Figure 23:
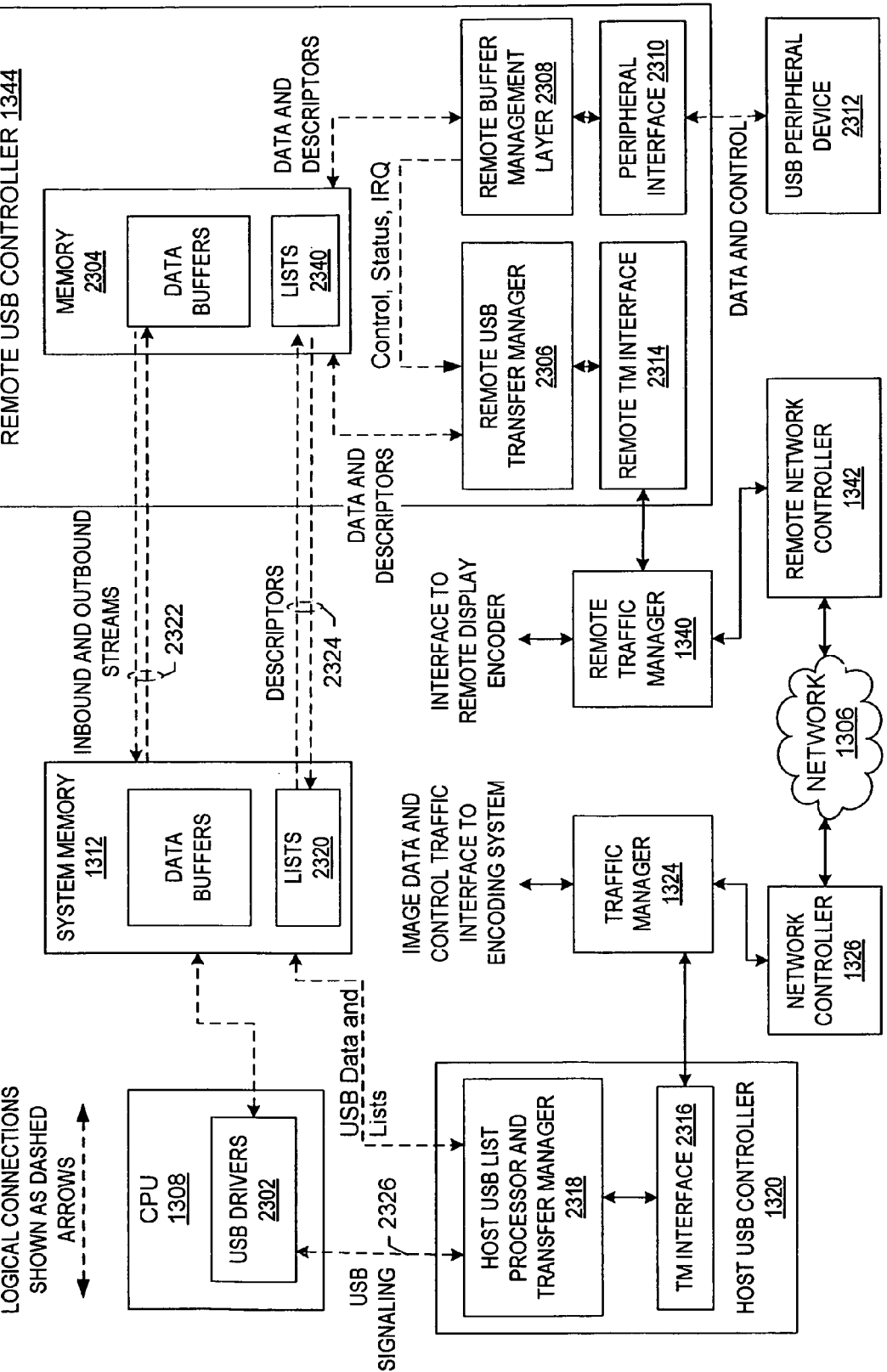
FIG. 23 is a block diagram of a bridged USB system enabled by host USB controller and remote USB controller in accordance with one or more embodiments of the present invention.

FIG. 23 is a block diagram of a bridged USB system 2300 enabled by a host USB controller 1320 and a remote USB controller 1344 in accordance with one or more embodiments of the present invention. In the embodiment shown in FIG. 23, CPU 1308 incorporates USB drivers 2302 that coordinate the communication of USB data, including management of the host USB controller 1320, initialization and control of descriptor lists and contents, and other standard driver functions. FIG. 23 illustrates the primary logical connections, data structures, control signaling and data flow between the CPU 1308, system memory 1312 and remote USB controller 1344. As shown, CPU 1308 communicates, for example USB descriptor contents, with peripheral USB device 2312 using host USB controller 1320 and remote USB controller 1344 to manage the communication between the endpoints at different layers. In the USB embodiment described, peripheral device 2312 is a USB device such as a USB mouse, USB memory card, or any other USB peripheral.

The host USB controller 1320 comprises a host USB list processor and transfer manager 2318 coupled to a traffic manager (TM) interface 2316, which is coupled to the traffic manager 1324. The remote USB controller 1344 comprises memory 2304, a remote USB transfer manager 2306, a remote buffer management layer 2308, a remote TM interface 2314, and at least one peripheral interface 2310. The remote TM interface 2314 is coupled to the remote traffic manager 1340.

At one logical layer, host USB controller 1320 and remote USB controller 1344 enable the transfer of inbound and outbound USB data streams 2322 by maintaining out-of-phase synchronization between data buffers and lists 2320 in system memory 1312 and data buffers and lists 2340 in the memory 2304 of the remote USB controller 1344 using underlying transfer management and network interface infrastructure. In the case of a USB bridge, lists include buffer and endpoint descriptor lists which are maintained in phase at both sides of the network 1306.

At a second logical layer, host USB list processor and transfer manager 2318 maintains a bidirectional link with the remote USB transfer manager 2306. Various update packets including list, operational register, and data update packets are transferred between the two modules using the underlying traffic manger interfaces 2316 and 2314 with each module transferring specific update information back to the opposite end of the link. Different data buffers may be concatenated into single packets for network efficiency. Different USB data types such as endpoint or transfer descriptors, bulk data, control messages, interrupt messages, or isochronous data types may be transferred using different network queues of varying priorities based on the USB data type. In one embodiment, control, status, and interrupts receive high priority while isochronous data receives medium priority and bulk data receives low priority.

At a lower logical layer, network controller 1326 communicates with remote network controller 1342. A reliable communication channel such as provided by the TCP/IP protocol is maintained for control and specified data packets while in some cases, such as isochronous media transfers, one or more best effort channels such as provided by the UDP/IP protocol may be used.

From a functional perspective, host USB list processor and transfer manager 2318 maintains information that tracks changes to the descriptor lists, including transfer control list (e.g., delay lists), search lists, lists of free endpoint, and buffer descriptor lists. Host USB list processor and transfer manager 2318 also maintains data queues of various traffic types for communications and tracks state information necessary to support the communication of inbound and outbound streams 2322. Host USB list processor and transfer manager 2318 communicates data and list information using published USB data and list structures (such as transfer descriptor and endpoint descriptors) in system memory 1312.

Host USB list processor and transfer manager 2318 presents USB signaling interface 2326 to USB drivers 2302 that ensures addressing, timing, and signaling (e.g., interrupt) of the peripheral device connection is in accordance with published USB specifications. For example in one embodiment, a standard open host controller interface (OHCI) operational register set interface is presented to the USB drivers 2302 corresponding with a remote OHCI USB controller; alternatively, a PCI or PCI-E interface may be presented.

Host USB list processor and transfer manager 2318 also supports packet processing methods. In the embodiment described, inbound packets from the network 1306 are disassembled into individual messages, system memory lists are updated and data smoothing algorithms are applied to inbound isochronous data streams to prevent stalling of DMA functions. In one embodiment, a pacing method is also used to synchronize inbound control traffic with corresponding media packets which may arrive at different times and out of sequence.

From a functional perspective, remote USB transfer manager 2306 maintains a remote list and host-directed data queues using buffers in memory 2304. In the embodiment of diagram 2300, remote USB transfer manager 2306 also performs state management functions in accordance with USB specifications. For example, USB specifications generally declare timing restrictions in the interval between certain USB operational state transitions. Remote USB transfer manager 2306 implements timers to ensure that these requirements are met. If an operational state update is received that would cause a violation, the update is ignored by remote USB transfer manager 2306. A subsequent operational state update, after the time requirement has been satisfied, is accepted to move remote buffer management layer 2308 to the desired state. Remote USB transfer manager 2306 also manages update packets to and from host USB list processor and transfer manager 2318 and performs packet processing functions using similar methods to those described for host USB list processor and transfer manager 2318.

From a functional perspective, remote buffer management layer 2308 accesses lists in memory 2304 and performs list processing of data buffers similar to those described for the buffer management layer. In the embodiment described, it also communicates with remote USB transfer manager 2306 by generating response messages and host-directed interrupt messages based on USB peripheral status, and responds to control messages from CPU 1308. USB system timing is derived from remote USB controller 1344. Peripheral device 2312 consumes (or generates) data at USB bus data rates determined by the peripheral interconnect; remote buffer management layer 2308 consumes (or generates) lists based on peripheral data rates and maintains synchronization with host USB list processor and transfer manager 2318 by requesting or sending list updates as needed.

In the embodiment shown, the peripheral interface 2310 presents a USB controller interface as defined by OHCI/ extended host controller interface (EHCI) and USB specifications to peripheral device 2312. This includes a power management response mechanism (for example a bus monitor to support a wake up state request) and transport means for standard USB clock, command, response and data types.

Figure 24:
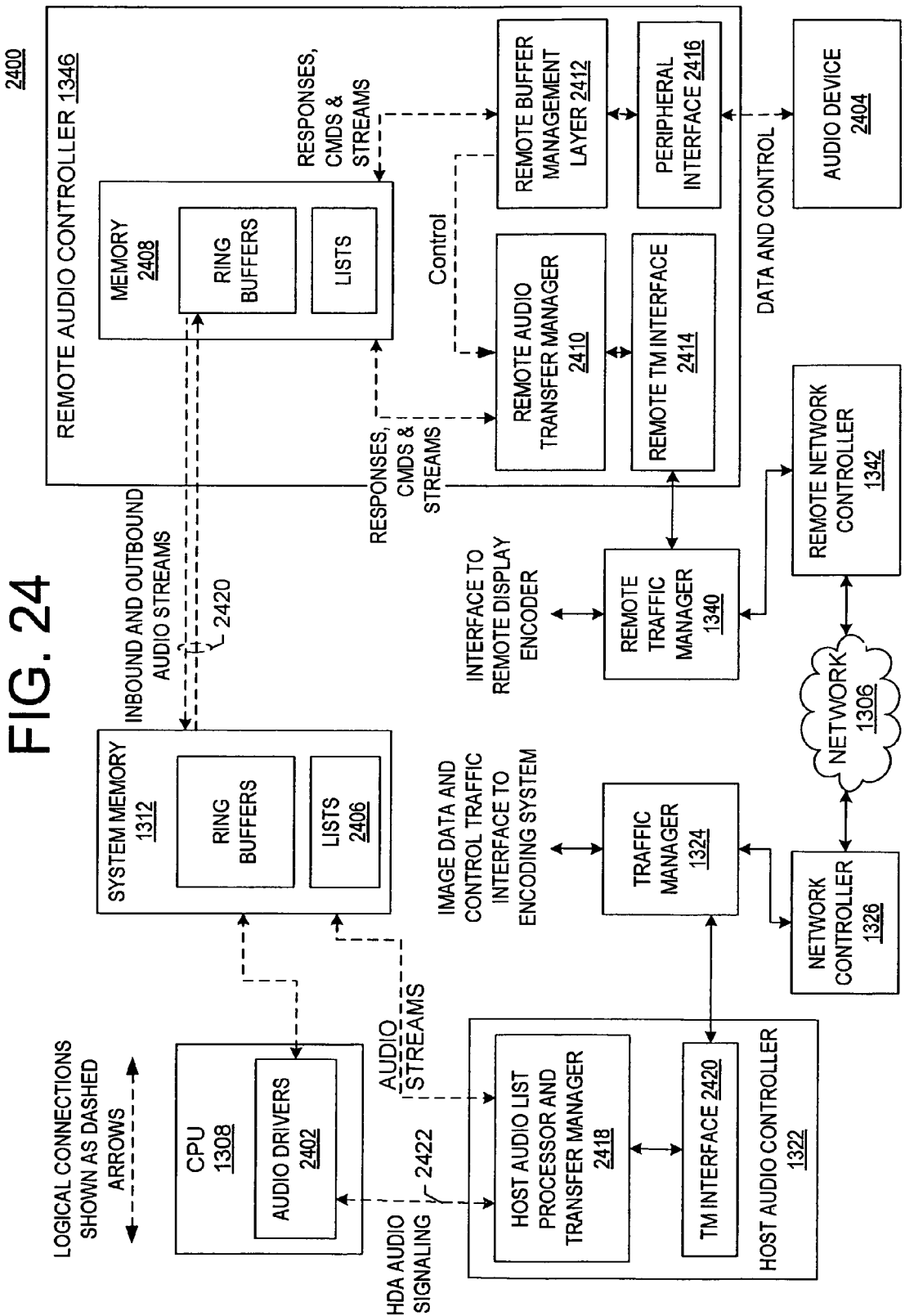
FIG. 24 is a block diagram of a bridged audio system enabled by a host audio controller and a remote audio controller in accordance with one or more embodiments of the present invention.

FIG. 24 is a block diagram of a bridged audio system 2400 enabled by a host audio controller 1322 and a remote audio controller 1346 in accordance with one or more embodiments of the present invention. As illustrated, CPU 1308 incorporates audio drivers 2402 that co-ordinate the communication of audio data, including management of host audio controller 1322, initialization and control of command, response, and audio data buffers in addition to other standard driver functions.

FIG. 24 illustrates the primary logical connections, data structures, control signaling, and data flow between the CPU 1308, system memory 1312, and remote audio controller 1346. As shown, CPU 1308 communicates with peripheral audio device 2404 using host audio controller 1322 and remote audio controller 1346 to manage the communication between the endpoints at different layers. In the exemplary high definition audio (HDA) audio embodiment illustrated, peripheral device 2404 is an HDA codec device.

The host audio controller 1322 comprises a host audio list processor and transfer manager 2418 coupled to a traffic manager (TM) interface 2420, which is coupled to the traffic manager 1324. The remote audio controller 1346 comprises memory 2408, a remote audio transfer manager 2410, a remote buffer management layer 2412, a remote TM interface 2414, and at least one peripheral interface 2416. The remote TM interface 2414 is coupled to the remote traffic manager 1340.

At the audio stream layer, host audio controller 1322 and companion remote audio controller 1346 enable the transfer of inbound and outbound audio streams 2420 by maintaining a set of ring buffers in system memory 1312 and memory 2408, one buffer corresponding to each inbound or outbound audio stream. Each buffer in memory 2408 corresponds to an HDA virtual stream buffer for the corresponding stream in system memory 1312. Audio streams are unidirectional data streams without the synchronization and data type complexity of the USB embodiment described above. Therefore, the HDA Command Outbound Ring Buffer (CORB) command structure, the Response Inbound Ring Buffer (RIRB) response structure and inbound or outbound media streams do not have the same timing sensitivity as USB, and tight synchronization of lists is not required at remote audio controller 1346. Rather, the CORB list has corresponding simple output command FIFO and the RIRB list has corresponding simple inbound response FIFO.

At a second logical layer, host audio list processor and transfer manager 2418 maintains a bidirectional link with remote audio transfer manager 2410. Outbound packets comprising outbound data streams, commands, and internal control messages are transferred from host audio list processor and transfer manager 2418 to remote audio transfer manager 2410 and host-directed data streams, codec responses, and internal control messages are transferred from remote audio transfer manager 2410 to host audio list processor and transfer manager 2418 using the underlying traffic manger interfaces 2420 and 2414 with each module transferring specific update information back to the opposite end of the link.

At a lower logical layer, network controller 1326 communicates with remote network controller 1342. A reliable communication channel such as provided by the TCP/IP protocol is maintained for control and specified data packets. In select cases, such as select isochronous media transfers, one or more best effort channels such as provided by the UDP/IP protocol may be used.

From a functional perspective, host audio list processor and transfer manager 2418 transfers published HDA audio list structures from system memory 1312 to remote audio transfer manager 2410 for relay to peripheral device 2404.

Host audio list processor and transfer manager 2418 presents an audio signaling interface 2422 to audio drivers 2402 that ensures addressing, timing, and signaling (e.g., interrupt) of the peripheral device connection is in accordance with published HDA audio specifications. A subset of the published register information held by host audio list processor and transfer manager 2418 and also used by peripheral device 2404 is maintained at remote buffer management layer 2412 and synchronized as required.

In some embodiments, host audio list processor and transfer manager 2418 also utilizes data processing algorithms suitable for the data type being transferred. Some embodiments include various packet processing functions optimized to meet the requirements of real time audio processing. As one example, a packet loss concealment algorithm, such as G.711A, is applied to inbound packets. As another example, silence suppression or audio compression methods are applied to outbound audio data prior to transmission in order to reduce the audio bandwidth.

Host audio list processor and transfer manager 2418 also deploys synchronization methods to ensure optimum first-in-first-out (FIFO) buffer levels. Given that the audio data rate is typically determined at remote audio controller 1346 by the clock rate of a peripheral interconnect, host audio list processor and transfer manager 2418 is synchronized to the remote timing system. One method of achieving synchronization of outbound audio is to regulate the playout of host frames to remote audio controller 1346 based on buffer level control commands issued by remote audio transfer manager 2410.

Remote audio transfer manager 2410 manages the communications of command, response, and stream data between memory 2408 and host audio list processor and transfer manager 2418. The remote audio transfer manager 2410 maintains pointers to jitter buffers and command buffers in memory 2408 and includes a packet generator that generates host-directed control and data packets with timing information such as frame identifiers. The remote audio transfer manager 2410 also performs various packet processing functions including jitter buffering of outbound streams, optional packet loss concealment methods on outbound packet streams, and compression or suppression of inbound packet streams. Remote audio transfer manager 2410 also performs register management functions, such as generating control packets that instruct host audio list processor and transfer manager 2418 to update published registers in cases where these are modified, and updating register information as instructed by host audio list processor and transfer manager 2418.

Remote buffer management layer 2412 performs buffer management functions. The remote buffer management layer 2412 generates frame data for outbound frames, reads data from jitter buffers, and generates data formatted to the requirements of the peripheral interface 2416. The remote buffer management layer 2412 communicates with remote audio transfer manager 2410; such communications include transfer of outbound commands to peripheral interface 2416 in addition to processing and framing of inbound responses and interrupts. The remote buffer management layer 2412 also groups inbound samples on a per-stream basis and forwards the groups to remote audio transfer manager 2410.

While the foregoing is directed to embodiments of the present invention, other and further embodiments of the invention may be devised without departing from the basic scope thereof.

The invention claimed is:

1. A system for providing computer input/output (I/O) functionality within a remote computing environment, comprising:
   a first combination comprising a host audio controller and a remote audio controller, the first combination enabled to bridge, via an Internet Protocol (IP) network, audio data between a processing system of a host computing system and at least one remote audio device;
   a second combination comprising a host Universal Serial Bus (USB) controller and a remote USB controller, the second combination enabled to bridge, via the IP network, USB data between the processing system and at least one remote USB device by enabling a transfer of USB transfer descriptors between the processing system and the remote USB controller, the remote USB controller enabled to process the USB transfer descriptors, the host USB controller enabled to present an industry-standard compliant USB controller interface to the processing system; and
   a third combination comprising an encoder module and a remote display decoder, the third combination enabled to bridge, via the IP network, a digital video signal and a Display Data Channel (DDC) between the processing system and a remote display, the processing system enabled to access specifications of the remote display via the DDC.

2. The system of claim 1, wherein the IP network comprises an Ethernet network.

3. The system of claim 1, wherein the digital video signal comprises at least one of a Digital Visual Interface (DVI) signal, a High Definition Multimedia Interface (HDMI) signal, a Digital Packet Video Link (DPVL) signal, or a DISPLAYPORT interface signal.

4. The system of claim 1, further comprising a general purpose input/output (GPIO) module and a remote GPIO module for bridging GPIO signals between the host computing system and at least one remote GPIO device.

5. The system of claim 1, wherein the encoder module and the remote display decoder provide a display management channel, the display management channel comprising the display data channel (DDC), between the host computing system and the remote display.

6. The system of claim 3, wherein the encoder module encodes the digital video signal in real time.

7. The system of claim 1, wherein an encoding method of the encoder module is selected based on at least one of an image type, image changes, a display priority, or network bandwidth availability.

8. The system of claim 1, wherein the encoder module and the remote display decoder synchronize the digital video signal and a reconstructed digital video signal at the remote display.

9. The system of claim 8, wherein the digital video signal and the reconstructed digital video signal are synchronized to have a delay of less than one frame period.

10. The system of claim 1, wherein bridging audio data comprises communicating commands between the host computing system and the at least one remote audio device, wherein at least one of the at least one remote audio device comprises an audio codec.

11. The system of claim 1, wherein bridging audio data comprises bridging the host audio controller and the remote audio controller at an audio buffer management layer.

12. The system of claim 1, wherein the host audio controller encodes a remote-directed audio data stream to generate an encoded remote-directed audio data stream and the remote audio controller decodes the encoded remote-directed audio data stream.

13. The system of claim 12, wherein the remote audio controller encodes at least one host-directed audio data stream to generate at least one encoded host-directed audio data stream and the host audio controller decodes the at least one encoded host-directed audio data stream.

14. The system of claim 13, wherein an audio encoding method is determined based on available network bandwidth.

15. The system of claim 1, wherein the host audio controller presents an industry-standard digital audio controller interface to the host computing system.

16. The system of claim 1, wherein bridging the USB data comprises bridging the host USB controller and the remote USB controller at a USB buffer management layer.

17. The system of claim 1, wherein bridging the USB data comprises communicating USB descriptor contents between the host computing system and the at least one remote USB device.

18. The system of claim 1, wherein bridging the USB data comprises communicating isochronous USB data between the host computing system and the at least one remote USB device.

19. The system of claim 1, wherein the USB data is transmitted between the host USB controller and the remote USB controller based on a USB data type priority.

20. The system of claim 1, wherein the industry-standard compliant USB controller interface comprises one of a Peripheral Component Interface (PCI) interface, a PCI Express interface, an Enhanced Host Controller Interface (EHCI), a Universal Host Controller Interface (UHCI), a Wireless Host Controller Interface or open host controller interface (OHCI).

21. The system of claim 1, wherein at least one of the at least remote audio device, the at least one remote USB device, or the remote display are able to operate as if locally connected to the host computing system.

22. The system of claim 1, wherein the at least one remote audio device, the at least one remote USB device, and the remote display are able to operate as if locally connected to the host computing system.

23. The system of claim 1, wherein the host computing system is able to operate using device and controller drivers intended for local connections of the at least one remote audio device, the at least one remote USB device, and the remote display.

24. The system of claim 1, wherein at least two of the audio data, the USB data, or image data corresponding to the digital video signal are prioritized for communication.

25. A method for providing computer input/output (I/O) functionality within a remote computing environment, comprising:
   bridging, by a first combination comprising a host audio controller and a remote audio controller, via an Internet Protocol (IP) network, audio data between a processing system of a host computing system and at least one remote audio device;
   bridging, by a second combination comprising a host Universal Serial Bus (USB) controller and a remote USB controller, via the IP network, USB data between the processing system and at least one remote USB device by enabling a transfer of USB transfer descriptors between the processing system and the remote USB controller, the remote USB controller enabled to process the USB transfer descriptors, wherein the host USB controller is enabled to present an industry-standard compliant USB controller interface to the processing system; and bridging, by a third combination comprising an encoder module and a remote display decoder, via the IP network, a digital video signal and a Display Data Channel (DDC) between the processing system and a remote display, the processing system enabled to access specifications of the remote display via the DDC.

26. The method of claim 25, wherein the IP network comprises an Ethernet network.

27. The method of claim 25, wherein all software on the host computing system operates substantially similar to an operation of all software on the host computing system when the at least one remote audio device, the at least one remote USB device, and the remote display are locally connected to the host computing system.

28. The method of claim 25, wherein bridging the audio data comprises bridging digital audio data between the host computing system and a remote audio codec.

29. The method of claim 25, wherein bridging the audio data, bridging the USB data, and bridging the digital video signal comprise communicating control data, the audio data, the USB data, and the digital video signal using at least one physical interface of the host computing system as a communication end point, the at least one physical interface used when communicating with local devices equivalent to the at least one remote audio device, the at least one remote USB device, and the remote display.

30. The method of claim 25, further comprising bridging general purpose input/output (GPIO) signals between the host computing system and at least one remote GPIO device.

31. The method of claim 25, wherein the encoder module and the remote display decoder provide a display management channel between the host computing system and the remote display, the display management channel comprising the Display Data Channel (DDC).

32. The method of claim 25, further comprising:
encoding the digital video signal to generate an encoded digital video signal; and
decoding the encoded digital video signal.

33. The method of claim 32, wherein encoding comprises at least one of encoding the digital video signal in real time or a lossless encoding of the digital video signal.

34. The method of claim 32, wherein encoding comprises selecting an encoding method based on at least one of an image type, image changes, a display priority, or network bandwidth availability.

35. The method of claim 32, wherein encoding comprises encoding quality improvements for stationary image partitions that are lossy encoded.

36. The method of claim 25, further comprising:
encoding at least one remote-directed audio data stream to generate at least one encoded remote-directed audio data stream; and
decoding the at least one encoded remote-directed audio data stream.

37. The method of claim 36, further comprising:
encoding at least one host-directed audio data stream to generate at least one encoded host-directed audio data stream; and
decoding the at least one encoded host-directed audio data stream.

38. The method of claim 37, wherein encoding the at least one remote-directed audio data stream and encoding the at least one host-directed audio data stream comprise determining an audio encoding method based on available network bandwidth.

39. The method of claim 25, wherein bridging the audio data comprises bridging the host audio controller and the remote audio controller at an audio buffer management layer.

40. The method of claim 28, wherein bridging the audio data comprises communicating control information between the host computing system and the remote audio codec.

41. The method of claim 28, wherein bridging the audio data comprises presenting a first industry-standard hardware audio controller interface to the host computing system and a second industry-standard hardware audio controller interface to the remote audio codec.

42. The method of claim 25, wherein bridging the USB data comprises bridging the host USB controller and the remote USB controller at a USB buffer management layer.

43. The method of claim 25, further comprising transmitting the USB data based on a USB transfer type, the USB transfer type comprising one of bulk, interrupt, control or isochronous.

44. The method of claim 25, wherein bridging the USB data comprises presenting the industry-standard compliant USB controller interface to the processing system and at least a second industry-standard USB controller interface to the at least one remote USB device.

45. The method of claim 25, wherein an operation of the at least one remote audio device, the at least one remote USB device, and the remote display comprises a user-perception equivalent to a local operation comprising local connections of the at least one remote audio device, the at least one remote USB device, and the remote display to the host computing system.

46. The method of 45, wherein the operation comprises a user-imperceptible delay and a user-imperceptible quality reduction with respect to the local operation.

47. The method of claim 25, further comprising prioritizing at least two of the audio data, the USB data, or image data corresponding to the digital video signal.

48. The system of claim 1, wherein the encoder module is enabled to compress the digital video signal in response to an available network bandwidth of the IP network and a network bandwidth requirement of the audio data and the USB data.

* * * * *